United States Patent
Nishida et al.

[11] Patent Number: 6,117,490
[45] Date of Patent: *Sep. 12, 2000

[54] COATING MATERIAL APPLICATION METHOD AND AN APPARATUS FOR USE IN SUCH A METHOD

[75] Inventors: Koji Nishida, Hirakata; Masaru Watanabe, Nishinomiya; Tsumoru Ohata, Kyoto, all of Japan

[73] Assignee: Matsushita Electric Industrial Co, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/941,259

[22] Filed: Oct. 1, 1997

[30] Foreign Application Priority Data

Oct. 2, 1996 [JP] Japan ................................ 8-261487

[51] Int. Cl.⁷ ...................................................... B05C 5/02
[52] U.S. Cl. .......................... 427/356; 118/232; 118/320; 401/193
[58] Field of Search ............................ 427/356; 118/410, 118/232, 320; 401/193, 266

[56] References Cited

U.S. PATENT DOCUMENTS

| | | | |
|---|---|---|---|
| 2,418,804 | 4/1947 | Hood | 201/76 |
| 4,038,442 | 7/1977 | Utumi | 427/128 |
| 4,074,655 | 2/1978 | Gross et al. | 118/410 |
| 4,324,816 | 4/1982 | Landis et al. | 427/118 |
| 4,407,690 | 10/1983 | White | 156/244.27 |
| 4,938,994 | 7/1990 | Choinski | 427/96 |
| 5,167,712 | 12/1992 | Shibata et al. | 118/410 |
| 5,702,527 | 12/1997 | Seaver et al. | 118/410 |
| 5,735,956 | 4/1998 | Ueberschaer et al. | 118/410 |
| 5,769,946 | 6/1998 | Kutsuzawa et al. | 118/407 |

FOREIGN PATENT DOCUMENTS 08126860 5/1996 Japan.

*Primary Examiner*—Shrive Beck
*Assistant Examiner*—Jennifer Calcagne
*Attorney, Agent, or Firm*—Smith Gambrell & Russell, LLP

[57] ABSTRACT

A coating material application method is for forming a film while guides disposed at both ends of the tip of a nozzle in the direction of application width and protruding to a substrate are contacted with the substrate, and while the gap between at least the outlet-side edge at the tip of the nozzle and the surface of the substrate is maintained constant.

15 Claims, 11 Drawing Sheets

(a)

(b)

COATING MATERIAL APPLICATION METHOD AND AN APPARATUS FOR USE IN SUCH A METHOD

BACKGROUND OF THE INVENTION

1. Field of the Invention

The present invention relates to a coating material application method for applying a coating material in predetermined patterns from a nozzle to the surface of a substrate, and also relates to an apparatus for use in such a method. The method and apparatus of the present invention are used to form light-shielding films on the surfaces of high-luminance discharge lamps for automotive headlamps, for example.

2. Description of the Related Art

A typical conventional method of this kind has been disclosed by Japanese Laid-open Patent Application No. 8-126860, for example. In this method, when a case constituting a hybrid integrated circuit is joined to a printed circuit board by adhesion, a nozzle is disposed vertically above an application position on the case used as a substrate with a predetermined gap maintained therebetween. While the discharge port disposed at the tip of the nozzle continuously discharges an adhesive mainly containing silicone resin or UV resin as a coating material, the discharge port is moved in a noncontact condition in parallel with the lengthwise direction of the application position so as to apply the adhesive continuously in such a manner as to draw a line.

In the case of the conventional line-drawing application method, it is necessary to consider the viscosity and thixotropy of a coating material. In particular, if a coating material is not provided with thixotropy, the coating material spreads over the surface of a substrate, that is, an application surface, immediately after the coating material is applied in a predetermined pattern, whereby the shape of the pattern may be distorted. In addition, it is necessary to maintain the gap between the tip of the nozzle and the substrate used as an application surface appropriately at all times. If the gap between the tip of the nozzle and the application surface is smaller than a predetermined value, the applied coating material is crushed by the tip of the nozzle, whereby it is impossible to obtain films having desired width and thickness values. On the other hand, if the gap between the tip of the nozzle and the application surface is larger than the predetermined value, air is apt to enter the space between the discharged coating material and the application surface, and so-called pin holes are generated in films, thereby exerting serious effects on the application position, such as displacement, and the accuracy of the application width and thickness. Furthermore, even if the gap between the tip of the nozzle and the application surface can be maintained constant, the gap may change because of undulation, distortion and nonuniform thickness generated on the substrate used as an application surface, or because of nozzle replacement conducted for maintenance, thereby making application unstable.

When the conventional line-drawing application method is used at a step of applying an adhesive in a production process wherein two or more members are joined by adhesion, the application width and thickness are not required to be controlled highly accurately on the order of several $\mu$m. Therefore, no problem has occurred. However, when the method is used to form a light-shielding film on the surface of a high-luminance discharge lamp for an automotive headlamp for example, highly accurate application is necessary, and serious problems have been caused.

SUMMARY OF THE INVENTION

In consideration of the above-mentioned problems encountered in the conventional application method, an object of the present invention is to provide an application method and an application apparatus which can apply a coating material to the surface of an substrate having a complicated sectional shape, such as a circular or polygonal shape, so that a film pattern having uniform thickness can be formed and so that the edge linearity at both ends of the pattern can have a value on the order of micron.

The first invention of the present invention is a coating material application method for forming a film while guides disposed at both ends of the tip of a nozzle in the direction of application width and protruding to a substrate are contacted with said substrate, and while the gap between at least the outlet-side edge at the tip of said nozzle and the surface of said substrate is maintained constant.

The second invention of the present invention is a coating material application method for forming a film while an application width is controlled by guides disposed at both ends of the tip of a nozzle in the direction of application width and protruding to a substrate.

The third invention of the present invention is a coating material application method comprising a step of charging a coating material into a predetermined coating material storage portion disposed at the tip of a nozzle, and a step of moving said nozzle and a substrate relative to each other and applying said coating material stored in said coating material storage portion to said substrate while the gap between the outlet-side edge at the tip of said nozzle and the surface of said substrate is maintained constant.

The fourth invention of the present invention is a coating material application method for forming a film in a predetermined pattern on the surface of a substrate by applying a thixotropic coating material having a viscosity of 100 (Poise) or more at a shear rate of 0.1 (1/sec) and a viscosity of 50 (Poise) or less at a shear rate of 100 (1/sec) through a nozzle.

The fifth invention of the present invention is a coating material application method according to the third or the fourth invention, wherein application is performed by using said guides disposed at both ends of the tip of said nozzle in the direction of application width and protruding to said substrate.

The sixth invention of the present invention is a coating material application method according to the first, the second or the fifth claim, wherein application is performed while said guides of said nozzle and said substrate are pressed relative to each other.

The seventh invention of the present invention is a coating material application method according to the first, the second, the third or the fourth invention, wherein the sectional shape of said substrate is circular, nearly circular, oval or polygonal, or has a combined shape of these.

The eighth invention of the present invention is a coating material application method according to the first, the second, the third or the fourth invention, wherein the thickness of a film is in the range of 5 to 500 $\mu$m in a wet condition immediately after application.

The ninth invention of the present invention is a coating material application apparatus comprising a nozzle having guides disposed at both ends of the tip thereof in the direction of application width and protruding to a substrate, moving means for moving said nozzle and said substrate relative to each other, and pressing means for pressing said substrate and said guides relative to each other.

The tenth invention of the present invention is a coating material application apparatus, wherein guides having an inner dimension therebetween equal to a target application width and protruding to a substrate are disposed at both ends of the tip of a nozzle in the direction of application width, and the tips of said guides have predetermined flat portions.

The eleventh invention of the present invention is a coating material application apparatus, wherein a coating material storage portion capable of storing at least an amount of a coating material required for application is disposed at the tip of a nozzle, and a predetermined gap is provided between said coating material storage portion and the surface of said substrate at least on the outlet side of said nozzle.

The twelfth invention of the present invention is a coating material application apparatus, wherein the sectional shape of a nozzle in the direction of application width is substantially the same as the sectional shape of a substrate at least on the outlet side of said nozzle, and the gap between said nozzle and the surface of said substrate is substantially uniform in the direction of application width.

The thirteenth invention of the present invention is a coating material application apparatus comprising securing means for holding and securing a rod-shaped member in at least three directions toward the sectional center of a cylindrical substrate, moving/rotating means for moving said cylindrical substrate in the axial direction thereof and/or for rotating said cylindrical substrate around the sectional center thereof, and nozzle means for forming a film pattern on said substrate in the axial and/or circumferential direction of said cylindrical substrate.

The fourteenth invention of the present invention is a coating material application apparatus according to the ninth, the tenth, the eleventh, the twelfth or the thirteenth invention, wherein the sectional shape of said substrate is circular, nearly circular, oval or polygonal, or has a combined shape of these.

The fifteenth invention of the present invention is a coating material application apparatus according to the tenth, the eleventh, the twelfth or the thirteenth invention, comprising guides disposed at both ends of the tip of said nozzle in the direction of application width and protruding to said substrate, and pressing means for pressing said nozzle and said substrate relative to each other.

The sixteenth invention of the present invention is a coating material application apparatus according to the ninth or the fifteenth invention, wherein said pressing means is a spring, an air cylinder, an oil damper, a magnet or a combination of these devices.

The seventeenth invention of the present invention is a coating material application apparatus according to the ninth, the tenth or the fifteenth invention, wherein the height of said guides of said nozzle is in the range of 5 to 2000 $\mu$m.

The eighteenth invention of the present invention is a coating material application apparatus according to the ninth or the fifteenth invention, wherein force for pressing said substrate and said guides relative to each other is in the range of 10 to 500 g.

The nineteenth invention of the present invention is a coating material application method comprising a step of contacting guides disposed at both ends of the tip of a nozzle in the direction of application width and protruding to a substrate with said substrate, a step of moving said nozzle and said substrate relative to each other and performing application while quantitatively supplying a coating material to the tip of said nozzle, and a step of stopping the supply of said coating material to the tip of said nozzle immediately before the end of application so that said coating material remaining at the tip of said nozzle is used to complete application.

The twentieth invention of the present invention is a coating material application method according to the nineteenth invention, wherein application is performed while said coating material is quantitatively supplied to the tip of said nozzle, the outer dimension at the tip of said nozzle including said guides being equal to a target application width.

The twenty-first invention of the present invention is a coating material application apparatus comprising a first lip and a second lip facing opposite each other to form a slit-shaped discharge port at the tip of a nozzle, guides disposed at both ends of said first lip in the direction of application width and protruding to a substrate, and a groove formed at both ends of said first and/or second lip in the direction of application width and used for guiding a coating material to said slit-shaped discharge port.

The twenty-second invention of the present invention is a coating material application apparatus according to the twenty-first invention, wherein the outer dimension at the tip of said nozzle including said guides disposed at the tip of said nozzle and protruding to said substrate is equal to a target application width.

DESCRIPTION OF THE PREFERRED EMBODIMENTS

Embodiments of the present invention are described below referring to drawings.

(Embodiment 1)

Figure 1:
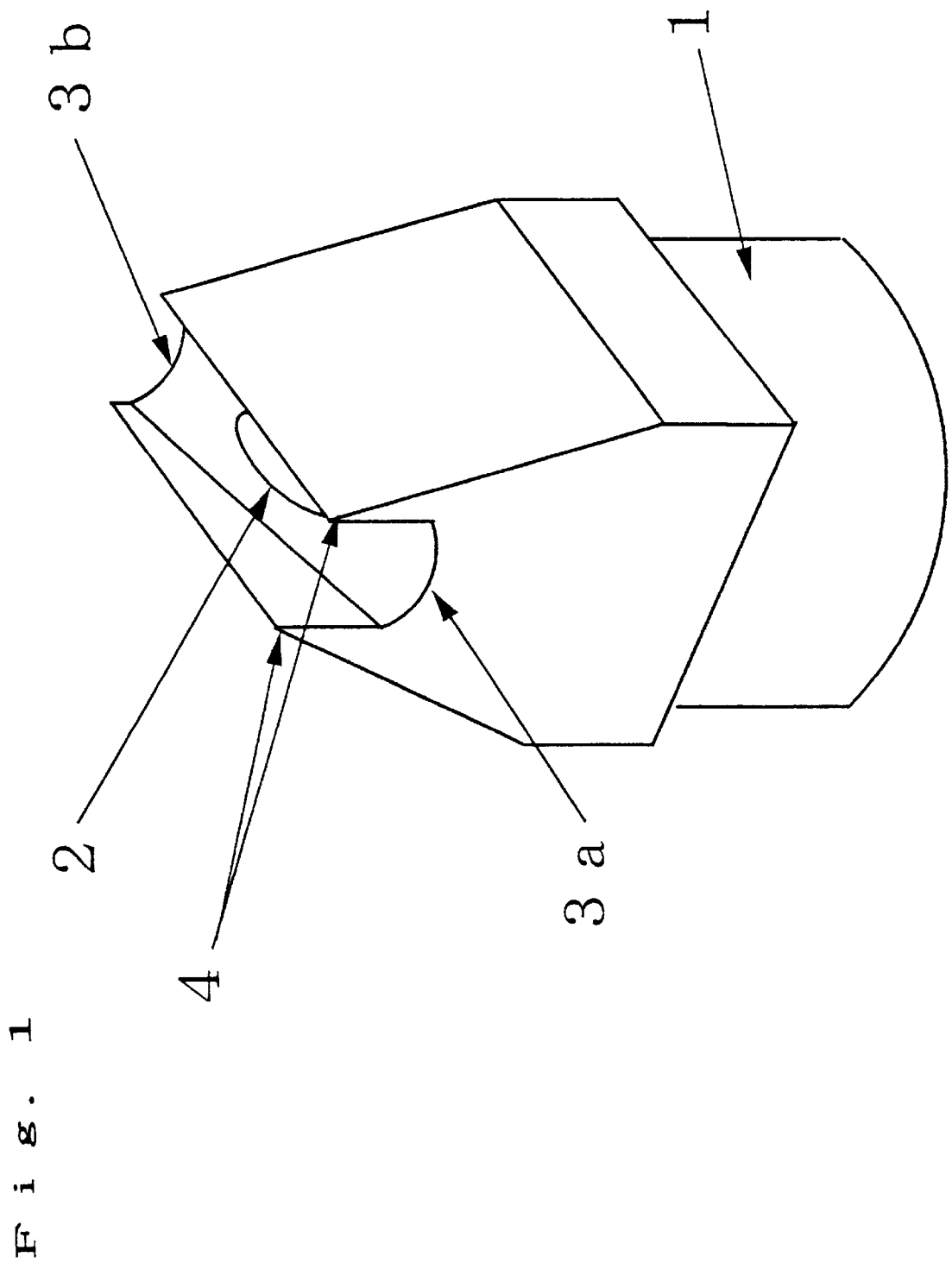
FIG. 1 is a perspective view showing a nozzle in accordance with a first embodiment of the present invention.
Figure 2:
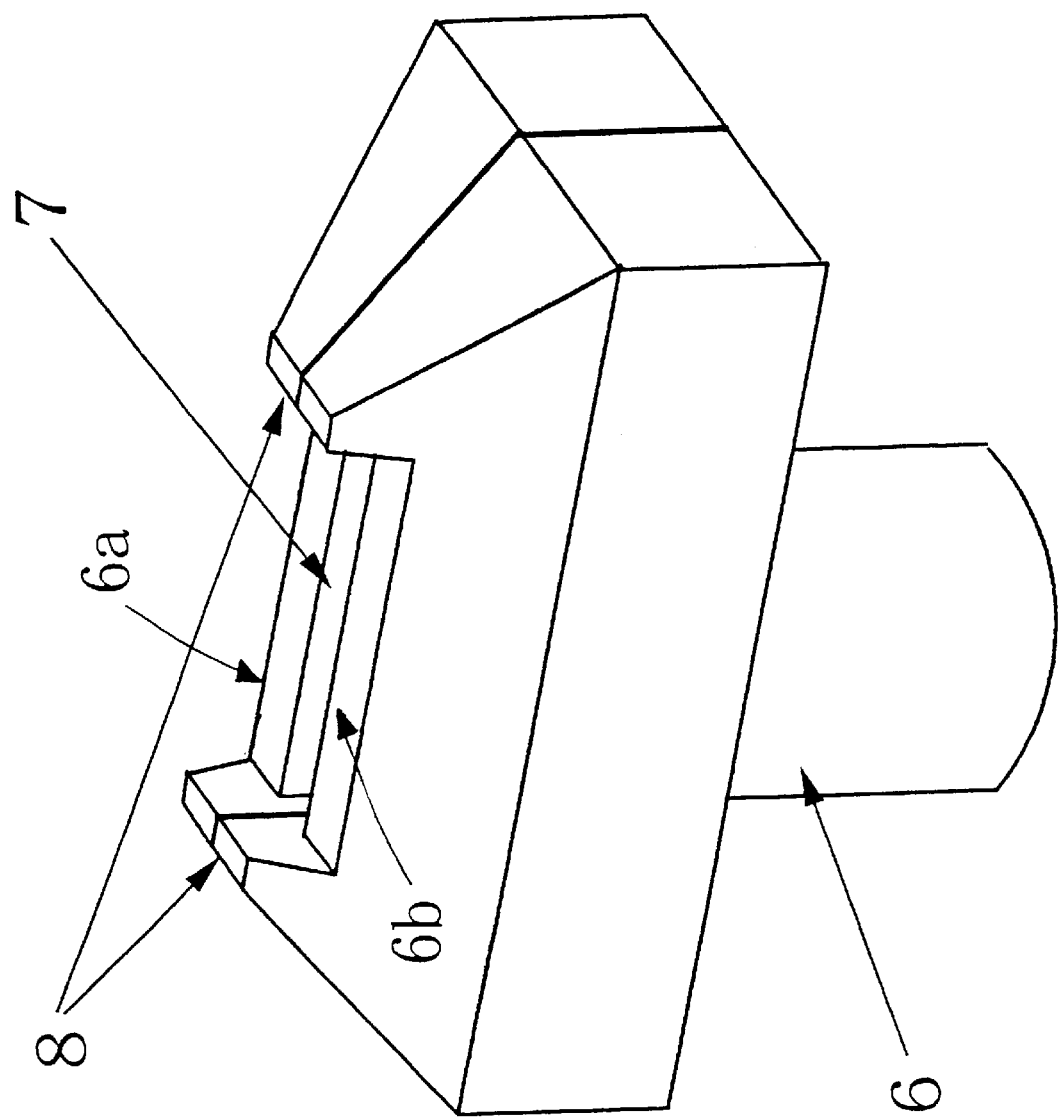
FIG. 2 is a perspective view showing another nozzle in accordance with the first embodiment of the present invention.

In Embodiment 1, forming light-shielding films by using a nozzle at predetermined positions on the surface of a high-luminance discharge lamp for an automotive headlamp, made of a quartz glass substrate having a cylindrical shape (outer diameter: 8.8 mm, length: 30.0 mm), is taken as an example. First, FIG. 1 shows the tip of a nozzle 1 used to form a linear pattern 15 in the axial direction of a quartz glass substrate 5 (hereinafter referred to as "substrate") having a cylindrical shape for a discharge lamp and shown in FIG. 3. FIG. 2 shows a nozzle 6 used to form a belt-shaped pattern 16 in the circumferential direction of the substrate 5 shown in FIG. 3. Referring to FIG. 1, reference code 2 designates a coating material discharge port provided with a through hole having an inner diameter of 1.5 mm. Reference code 3a designates a coating material storage portion, that is, a space equivalent to the amount of a coating material required for forming a film. Reference code 3b designates an outlet-side edge used to perform control so that the film can have a predetermined thickness. A curved surface having a radius of curvature equal to that of the surface of the substrate 5 is formed on the surface from the coating material storage portion 3a to the edge 3b. Reference code 4 designates guides for controlling the application width of the linear pattern 15, for linearizing the edges at both ends of the pattern 15 and for maintaining the gap between the surface of the substrate 5 and the outlet-side edge 3b constant at all times. The gap between the outlet-side edge 3b and the substrate 5, that is, the step difference at the guides 4 is formed to have a value of 25 $\mu$m in consideration of the thickness of the film in a wet condition. Although the tip of the guide 4 has a sharp edge, the shape of the tip is not limited to this shape.

Referring to FIG. 2, reference code 7 designates a slit-shaped discharge port for uniformly discharging a coating material in the width direction. The gap at the slit is set at 200 $\mu$m in the case of Embodiment 1. Reference code 8 designates guides for maintaining the gap between the surface of the glass substrate 5 and the outlet-side edge 6a constant at all times and for controlling the edge linearity at both ends of the width of the belt-shaped pattern 16. In Embodiment 1, the step difference between the outlet-side edge 6a and the guides 8 is set at 100 $\mu$m.

Figure 3:
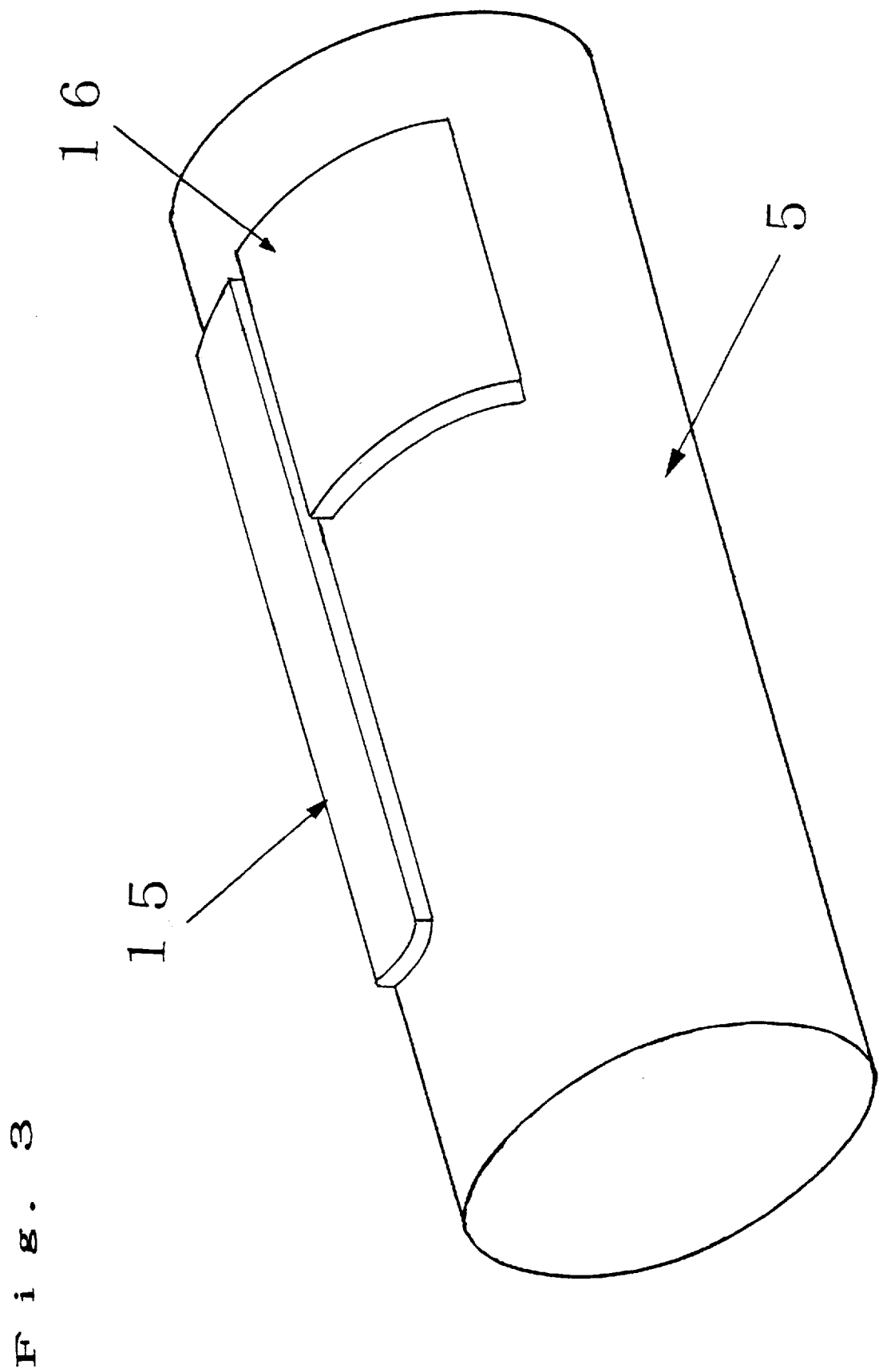
FIG. 3 is a perspective view showing patterns formed in accordance with the first embodiment of the present invention.
Figure 5:
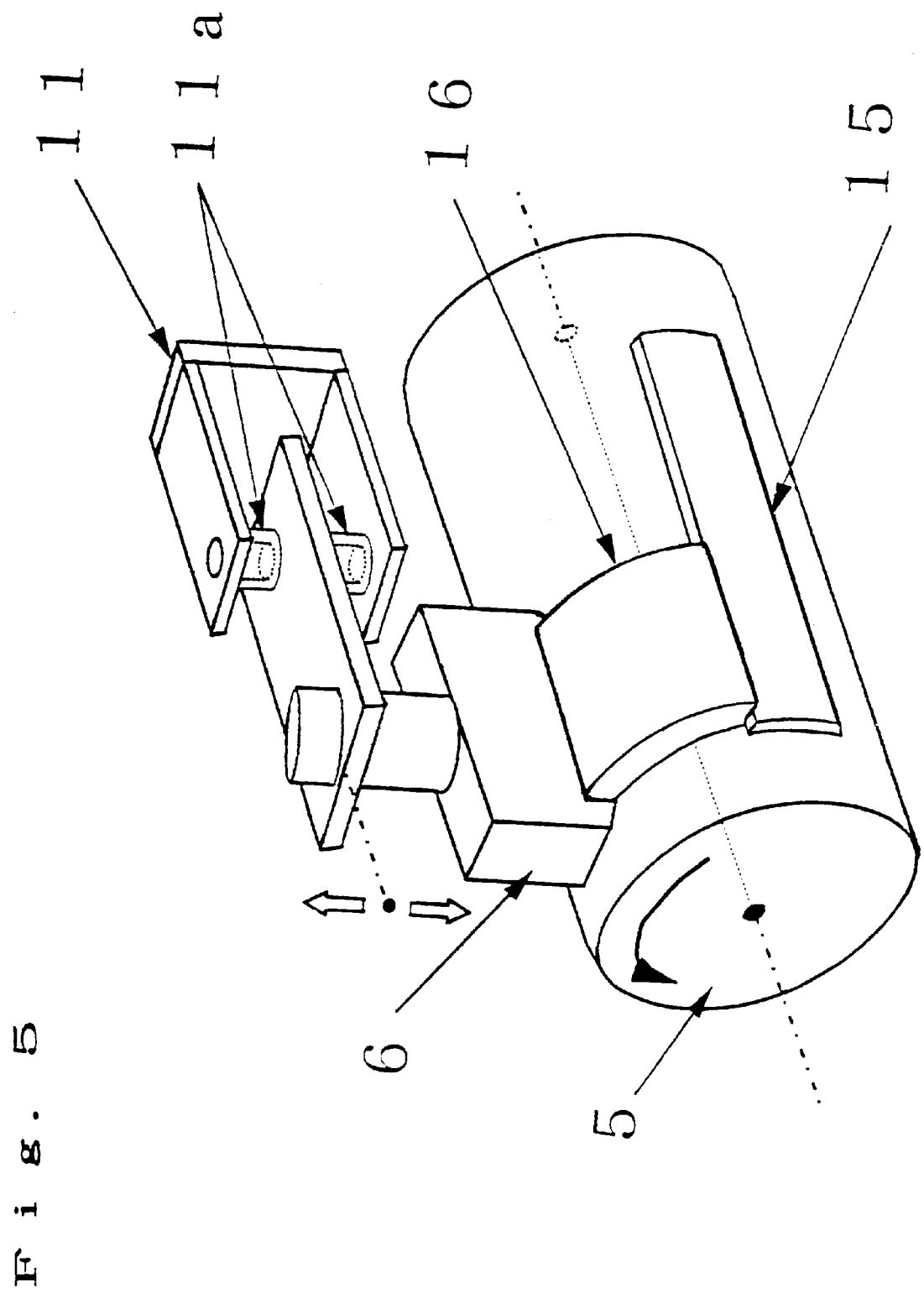
FIG. 5 is a perspective view showing an application portion in accordance with the first embodiment of the present invention.

The light-shielding film patterns shown in FIG. 3 have the following dimensions. The two linear patterns 15 are formed in the axial direction of the substrate 5 at intervals of 220° with respect to the center of the cross section thereof, each having a width of 1.8 mm and a length of 25.0 mm. The belt-shaped pattern 16 is formed to have a width of 8.2 mm in the circumferential direction ranging 220° from the application start or stop end of the two linear patterns. FIG. 5 shows the patterns formed as described above.

Figure 4:
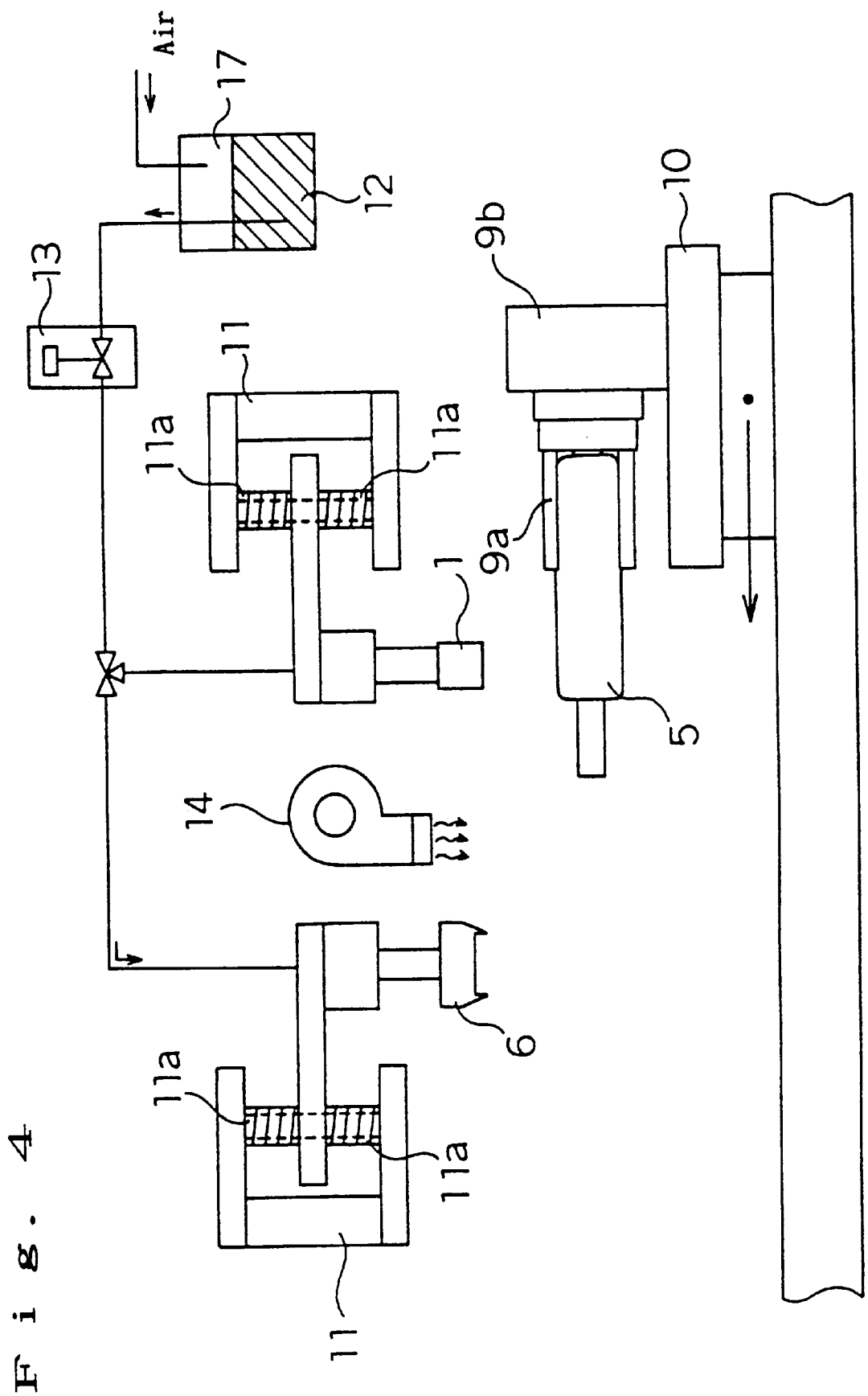
FIG. 4 is a schematic view showing an application system in accordance with the first embodiment of the present invention.
Figure 6:
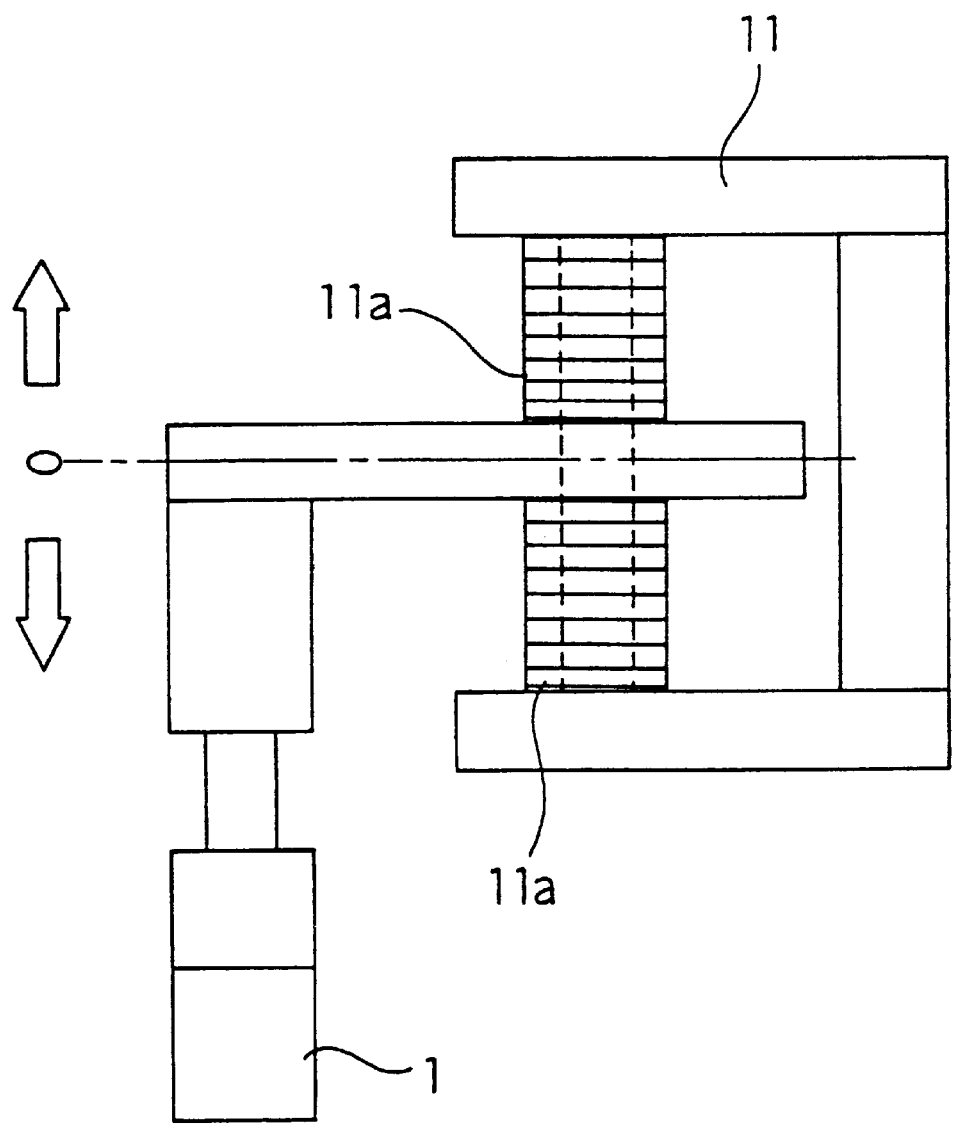
FIG. 6 is a side view showing a soft-touch jig in accordance with the first embodiment of the present invention.

FIG. 4 is a schematic view showing a basic application system using the nozzles 1 and 6 used to form the light-shielding film patterns shown in FIG. 3. Referring to FIG. 4, a holding jig 9a for holding the substrate 5 with a plurality of arms in the radial direction of the cross section of the substrate 5 is provided as means for holding and securing the substrate 5 horizontally. In addition, an ultrasound motor 9b (hereinafter referred to as "rotary chuck jig 9", as a combination of 9a and 9b) having 0.09° rotating resolution is used for the present embodiment as means for rotating the substrate 5 when the application positions of the linear patterns 15 are determined in the circumferential direction and when the belt-shaped pattern is formed by application. Furthermore, a linear-motor-driven slide stage 10 (hereinafter referred to as "slide stage 10") is used for the present embodiment as means for moving the rotary chuck jig 9, which horizontally holds and secures the substrate 5, in the axial direction at a predetermined speed by a predetermined distance. Furthermore, a soft-touch jig 11 is provided as means for contacting and pressing the nozzles 1 and 6 against the surface of the substrate 5 at a predetermined load. In Embodiment 1, the nozzles 1, 6 are pressed against the substrate at a load of 100 g by using the pressure of a spring 11a. The soft-touch jig 11 has a structure shown in FIG. 6. A coating material which is dispersion of the composition shown in TABLE 1 is used as a coating material 12.

TABLE 1

| Compounds of composition | Amount of addition [g] |
|---|---|
| Manganese oxide | 100 |
| Iron oxide containing manganese | 100 |
| Zinc-based powder glass | 100 |
| Pure water | 197 |
| Carboxyl methyl cellulose | 2 |
| Mineral-based thickener | 1 |

As means for supplying a coating material, a pressure tank 17 for feeding liquid into a pressurized container or a syringe container filled with a predetermined amount of the coating material 12 by applying pneumatic pressure is used in combination with a valve 13 having a pneumatic needle valve function for controlling the supply and stop of the coating material to the nozzles at preset time intervals. In addition, a dryer 14 is also provided at a predetermined position on the slide stage 10 to temporarily dry films. A method for forming the light-shielding film patterns shown in FIG. 3 by using the above-mentioned basic coating system is described below.

The substrate 5 is held and secured horizontally by using the holding 9a of the rotary chuck jig 9, and a predetermined pulse value is input to the ultrasound motor 9b. After the substrate 5 is moved to an application position for one of the two linear patterns 15, the nozzle 1 is lowered by lowering means (not shown), and the guides 4 disposed at the tip of the nozzle 1 is pressed against the surface of the substrate 5. The pressing load applied at this time is maintained at a load of 100 g by the pressure of the spring provided in the soft-touch jig 11. After the tips of the guides 4 of the nozzle 1 are contacted with and pressed against the substrate 5, the coating material 12 charged in the pressurized container or syringe container 17 is pressurized at a pneumatic pressure of 0.2 kg/cm$^2$, and fed to the valve 13. By opening the valve only for 0.1 second, an application amount of the coating material 12 required to form a linear pattern having a length of 25.0 mm, that is, 0.001 cc, is supplied and charged into the coating material storage portion 3a disposed at the tip of the nozzle 1. By moving the slide stage 10 at a speed of 2.5 mm/sec, a film is formed by the coating material 12 discharged from a gap of 25 $\mu$m formed between the outlet-side edge 3b at the tip of the nozzle 1 and the substrate 5. While the linear pattern 15 is formed as described above, the nozzle 1 follows the undulation and distortion generated on the surface of the substrate 5 in the axial direction thereof by virtue of the soft-touch jig 11, whereby the gap between the outlet-side edge 3b at the tip of the nozzle 1 and the surface of the substrate 5 is maintained constant at all times. As a result, the film can have a uniform thickness regardless of the presence or absence of deformation on the substrate 5. In addition, by the control of the guides 4 disposed at the tip of the nozzle 1 and by the function of the soft-touch jig 11, application can be performed stably at all times so that an edge linearity of ±2 μm can be obtained at both ends of the linear pattern 15. After the application for the first linear pattern is completed, the nozzle 1 is moved away from the surface of the substrate 5 by lifting means (not shown) to make preparations for forming the next linear pattern. The film of the linear pattern is then temporarily dried by the dryer 14 also provided on the slide stage 10. The temporary drying stops when the slide stage 10 returns to the application start position.

The substrate 5 is rotated 220° in the circumferential direction by the ultrasound motor 9b to the application position for the next linear pattern. Application for the second linear pattern is then performed just as in the case of the application method for the first linear pattern. After the application, temporary drying is performed by the dryer 14 just as in the case of the drying method for the first linear pattern. After the temporary drying, the slide stage 10 moves again to the application stop end side of the second linear pattern and then stops.

The nozzle 6 provided with the soft-touch jig 11 just as in the case of the nozzle 1 is on standby at a position vertically above the stop position. By lowering the nozzle 6 by using lowering means (not shown), the guides 8 provided at the tip of the nozzle 6 are contacted with and pressed against the application stop end of the linear pattern formed on the surface of the substrate 5. The pressing load applied at this time is set at 100 g by the pressure of the spring provided in the soft-touch jig 11 just as in the case of the pressing load for the nozzle 1. After the tips of the guides 8 of the nozzle 6 are contacted and pressed, the coating material 12 is fed under pressure just as in the case of the application method for the linear patterns. A predetermined amount of the coating material 12 required for forming the belt-shaped pattern 16 is then discharged in the width direction from the slit-shaped discharge port 7 disposed at the tip of the nozzle 6 by opening the valve 13 only for 2.8 seconds required for the application. Since the step difference between the outlet-side edge 6a and the tips of the guides 8, that is, the gap between the substrate 5 and the outlet-side edge 6a in the application condition, is 100 μm, the coating material 12 is applied at a constant film thickness of about 100 μm. Concurrently with the start of discharge, the ultrasound motor 9b rotates 220° in the circumferential direction at 12.0 rpm so that the coating material is applied to form the belt-shaped pattern. During this application, just as in the case of the application method for the linear patterns, the nozzle 6 follows the undulation and distortion generated on the surface of the substrate 5 in the circumferential direction thereof by virtue of the soft-touch jig 11, whereby the gap between the outlet-side edge 6a at the tip of the nozzle 6 and the surface of the substrate 5 is maintained constant at all times. As a result, the film can also have a uniform thickness in the circumferential direction. In addition, by the control of the guides 8 disposed at the tip of the nozzle 6 and by the function of the soft-touch jig 11, application can be performed stably at all times so that an edge linearity of ±2 μm can be obtained at both ends of the width of the belt-shaped pattern 16.

In the methods of forming the predetermined light-shielding film patterns on the surface of the glass substrate 5, the conventional line-drawing application method uses a noncontact method wherein the tip of the nozzle does not contact the substrate. Therefore, the thickness of the film is greatly affected by the variation in the gap between the substrate and the tip of the nozzle. For this reason, a variation of ±50 μm in the thickness has been the limit, and an edge linearity of about 100 μm at both ends in the width direction has also been the limit. In addition, since the coating material is applied to a curved substrate surface when forming a belt-shaped pattern, it has been difficult to obtain uniform thin films by using a general line-drawing nozzle or by a noncontact application method. On the other hand, in the case of the application method of the present invention, the thickness of film patterns can be controlled by properly setting the gap between the substrate surface and the outlet-side edge at the tip of the nozzle.

Figure 8:
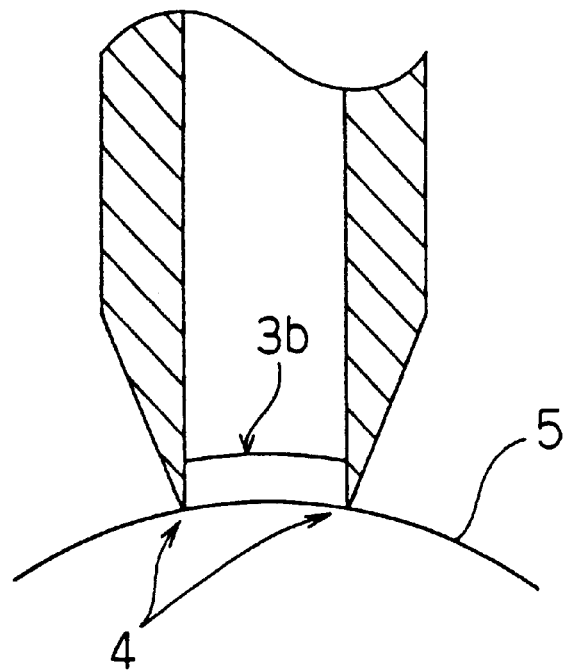
FIGS. 8a and 8b are sectional views showing the tips of nozzles in accordance with an eighth embodiment of the present invention.
Figure 8:
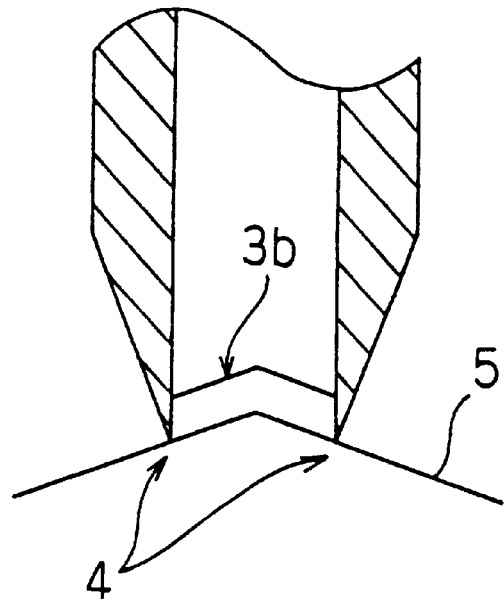

In Embodiment 1, the step difference between the outlet-side edge 3b and the guides 4 at the tip of the nozzle 1 for forming the linear patterns is set at 25 μm. However, by increasing or decreasing the step difference, the thickness of the film immediately after application can be controlled in the range of 5 to 500 μm. The film thickness of the linear patterns in the case of Embodiment 1 can have a small value of 15.0 μm on average after drying. Furthermore, the film thickness of the belt-shaped pattern can have a value of 85 μm on average after drying, since the step difference between the outlet-side edge 6a and the guides 8 at the tip of the nozzle 6 is set at 100 μm. In addition, although the sectional shape of the substrate is circular in Embodiment 1, the shape is not limited to be circular. Even when the shape is nearly circular, oval or polygonal, or has a combined shape of these, the same effect can be obtained by changing the shape of the tip of the nozzle depending on the shape of the substrate. In case the partial cross-section of the substrate has two flat planes as shown in FIG. 8b, the same effect as that of the present embodiment can be obtained by changing the shape of the tip of the nozzle including the outlet-side edge 3b thereof so as to have a shape similar to that of the substrate.

(Embodiment 2)

Embodiment 2 features an application method wherein film forming is performed while an application width is controlled by guides disposed at both ends of the tip of a nozzle in the direction of application width and protruding to a substrate.

In Embodiment 2, the inner dimension (width) between the guides 4 disposed at both ends of the tip of the nozzle shown in FIG. 1 in the direction of application width and protruding to the substrate is set at 1.8 mm so as to be equal to the width of the linear pattern 15 of the light-shielding film shown in FIG. 3. With this structure, the coating material 12 is applied to the surface of the glass substrate 5 in the axial direction thereof by using the application system shown in FIG. 4. A coating material which is dispersion of the composition shown in TABLE 1 is used as the coating material 12. The coating material is supplied and charged into the coating material storage portion 3a disposed at the tip of the nozzle 1 by means similar to that used in Embodiment 1.

At this time, the coating material 12 is completely prevented from leaking by the guides 4 disposed at both ends of the tip of the nozzle 1 in the direction of application width and protruding to the substrate, whereby the amount of the coating material supplied and charged into the coating material storage portion 3a is maintained. As the slide stage 10 is moved, the coating material 12 is applied from the outlet-side edge 3b to form the linear pattern 15, while a film thickness of about 25 μm is maintained and the application width is controlled to 1.8 mm by the guides 4. During this application, the nozzle follows the undulation and distortion generated on the surface of the substrate 5 in the axial direction thereof by virtue of the soft-touch jig 11, and the application width is stably controlled by the guides 4, whereby the application width of the linear pattern 15 can have an accurate value, and an edge linearity of ±2 μm can be obtained at both ends of the pattern.

In addition, in Embodiment 2, the inner dimension (width) between the guides 8 disposed at the tip of the nozzle 6 shown in FIG. 2 is set at 8.2 mm so as to be equal to the width of the belt-shaped pattern 16 of the light-shielding film shown in FIG. 3. The step difference between the outlet-side edge 6a and the guides 8 is set at 100 μm. With this structure, the coating material is applied to the area between the two linear patterns on the surface of the glass substrate 5 in the circumferential direction thereof by using the application system shown in FIG. 4. While the film thickness is maintained at 100 μm or less in the width direction in a wet condition, and the application width is controlled to 8.2 mm by the guides 8, the coating material is applied to form a belt-shaped pattern. At this time, just as in the case of the formation of the above-mentioned linear patterns, the nozzle 6 follows the undulation and distortion generated on the surface of the glass substrate 5 in the circumferential direction thereof by virtue of the soft-touch jig 11, and the application width can be controlled by the guides 8, whereby application can be performed stably at all times in the circumferential direction so that an edge linearity of ±2 μm can be obtained at both ends of the pattern.

In consideration of the above-mentioned structure of the tip of the nozzle, in the case of the conventional line-drawing application method wherein the tip of a nozzle does not make contact with a substrate, it is impossible to obtain linear and belt-shaped patterns while maintaining the width of application highly accurately. On the other hand, in the case of the application method in accordance with Embodiment 2, by contacting the guides at the tip of the nozzle with the surface of a substrate, and by setting the inner dimension between the guides at both ends of the tip of the nozzle in the direction of application width as desired, the width of application can be controlled highly accurately to have the preset inner dimension. Furthermore, in Embodiment 2, the step difference between the outlet-side edge 3b and the guides 4 at the tip of the nozzle 1 is set at 25 μm, and the step difference between the guides 8 and the outlet-side edge 6a at the tip of the nozzle 6 is set at 100 μm. However, by increasing or decreasing these step differences, the thickness of the film immediately after application can be controlled in the range of 5 to 500 μm. In addition, although the sectional shape of the substrate is circular in Embodiment 2, the shape is not limited to be circular. Even when the shape is nearly circular, oval or polygonal, or has a combined shape of these, the same effect can be obtained by changing the shape of the tip of the nozzle depending on the shape of the substrate.

(Embodiment 3)

Embodiment 3 features an application method wherein after a coating material is charged into a predetermined coating material storage portion disposed at the tip of a nozzle, the nozzle and a substrate are moved relative to each other while at least the gap between the substrate and the outlet-side edge at the tip of the nozzle is maintained constant, and the coating material in the coating material storage portion is applied to form films on the substrate.

In Embodiment 3, the inner dimension (width) between the guides 4 disposed at both ends of the tip of the nozzle 1 shown in FIG. 1 in the direction of application width and protruding to the substrate is set at 1.8 mm so as to be equal to the width of the linear pattern 15 of the light-shielding film shown in FIG. 3, and the step difference between the outlet-side edge 3b and the tips of the guides 4 is set at 25 μm. With this structure of the nozzle, the coating material 12 is applied to the surface of the glass substrate 5 in the axial direction thereof by using the application system shown in FIG. 4. A coating material which is dispersion of the composition shown in TABLE 1 is used as the coating material 12.

By using means similar to that used in Embodiment 1, an application amount of the coating material 12 required to form the linear pattern 15, that is, 0.001 cc, is supplied and charged into the coating material storage portion 3a disposed at the tip of the nozzle 1. At this time, the coating material 12 is completely prevented from leaking by the guides 4 disposed at both ends of the tip of the nozzle 1 in the direction of application width and protruding to the substrate, whereby the amount of the coating material charged into the coating material storage portion 3a is maintained. In Embodiment 3, the nozzle is stationary, and the substrate 5 is moved at a speed of 2.5 mm/sec in the axial direction by the slide stage 10. The coating material 12 supplied and charged in the coating material storage portion 3a at the tip of the nozzle is applied from the outlet-side edge 3b to form a pattern, while a film thickness of about 25 μm is maintained and the application width is also maintained at 1.8 mm by the guides 4. At this time, the nozzle 1 follows the undulation and distortion generated on the surface of the substrate 5 in the axial direction thereof by virtue of the soft-touch jig 11, whereby the gap between the outlet-side edge 3b at the tip of the nozzle 1 and the substrate 5 is maintained constant at all times. As a result, the film can have a uniform thickness. In addition, the width of application is controlled by the guides 4. Consequently, an edge linearity of ±2 μm can be obtained along the application width and at both ends of the width of the linear pattern. In addition, in Embodiment 3, the inner dimension (width) between the guides 8 disposed at the tip of the nozzle 6 shown in FIG. 2 is set at 8.2 mm so as to be equal to the width of the belt-shaped pattern 16 of the light-shielding film shown in FIG. 3, and the step difference between the outlet-side edge 6a and the guides 8 is set at 100 μm. When the tips of the guides 8 disposed at the tip of the nozzle 6 are contacted with and pressed against the surface of the glass substrate 5, about 0.005 cc of the coating material 12, an amount required to form the belt-shaped pattern 16, is charged into the coating material storage portion 6b disposed on the upstream side from the slit-shaped outlet 7 so as to form a stored amount of the coating material. The glass substrate 5 is then rotated 220° in the circumferential direction at a constant speed by the ultrasound motor 9b. At this time, while the film thickness nearly equal to the depth at the outlet-side edge 6a is maintained at 100 μm or less in the width direction in a wet condition, and the application width is maintained at 8.2 mm by the guides 8, the coating material is applied to form a belt-shaped pattern. At this time, just as in the case of the formation of the above-mentioned linear patterns, the nozzle 6 follows the undulation and distortion generated on the surface of the glass substrate 5 in the circumferential direction thereof by virtue of the soft-touch jig 11, and the gap between the outlet-side edge 6a and the substrate is maintained constant. As a result, the film can have a uniform thickness. In addition, by controlling the width of application by using the guides 8, an edge linearity of ±2 μm can be obtained along the application width and at both ends of the width of the belt-shaped pattern.

In consideration of the above-mentioned structure of application, in the case of the conventional line-drawing application method wherein the coating material is discharged continuously with the tip of a nozzle not making contact with a substrate, it is impossible to obtain linear and belt-shaped patterns while maintaining the thickness and width of application highly accurately. On the other hand, in the case of the application method in accordance with Embodiment 3, while the guides disposed at both ends of the tip of the nozzle in the direction of application width are contacted with and pressed against the surface of the substrate 5, and the gap between the substrate and the outlet-side edge at the tip of the nozzle is maintained constant, the substrate and the nozzle are moved relative to each other, whereby a film pattern can be formed highly accurately. Therefore, the same effect can be obtained when the substrate is stationary and the nozzle is moved. In addition, the step difference between the outlet-side edge 3b and the guides 4 at the tip of the nozzle 1 is set at 25 µm, and the step difference between the guides 8 and the outlet-side edge 6a at the tip of the nozzle 6 is set at 100 µm in Embodiment 3. However, by increasing or decreasing these step differences, the thickness of the film immediately after application can be controlled in the range of 5 to 500 µm. Furthermore, although the sectional shape of the substrate is circular in Embodiment 3, the shape is not limited to be circular.

Even when the shape is nearly circular, oval or polygonal, or has a combined shape of these, the same effect can be obtained by changing the shape of the tip of the nozzle depending on the shape of the substrate.

(Embodiment 4)

Embodiment 4 of the present invention features an application method which uses a thixotropic coating material having a viscosity of 100 (Poise) or more at a shear rate of 0.1 (1/sec) and a viscosity of 50 (Poise) or less at a shear rate of 100 (1/sec). Other structures are similar to those in accordance with Embodiment 1 and not described here.

Figure 7:
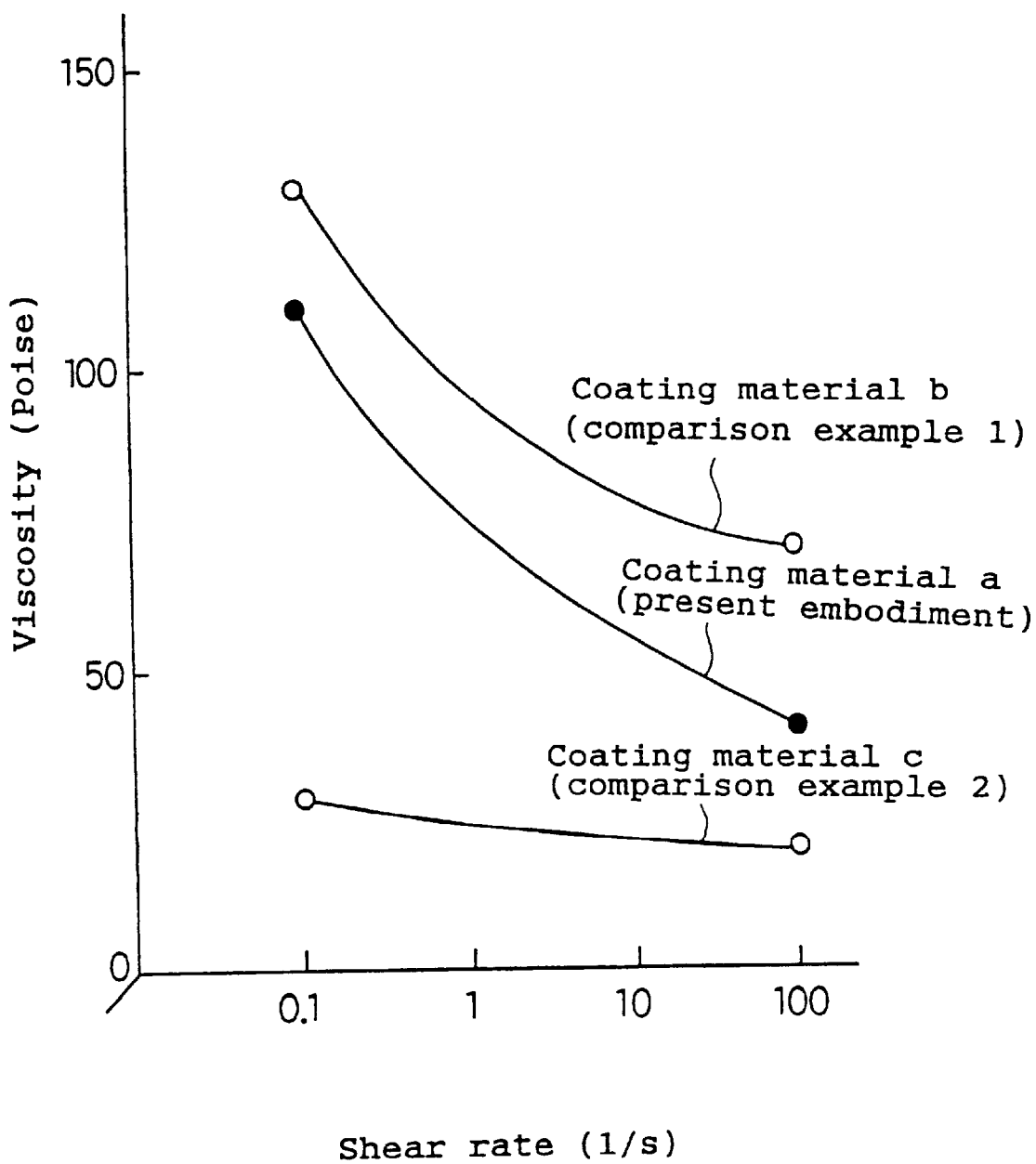
FIG. 7 is a graph showing the fluidity characteristic of a coating material in accordance with a fourth embodiment of the present invention.

In Embodiment 4, coating material a having the composition shown in (Table 1) was produced. The coating material contains 60 wt % of solid matter and 1 g of a mineral-based thickener as an additive for offering thixotropy. The fluidity characteristic of the coating material is shown in FIG. 7 as the relationship between the shear rate and viscosity of the coating material. Coating material b containing 2 g of the mineral-based thickener and coating material c without containing the thickener were also produced as comparison examples.

These coating materials were applied by an application method similar to that in accordance with Embodiment 1 in order to form film patterns. Coating materials b, a comparison example, had a viscosity of 130 (Poise) at a shear rate of 0.1 (1/sec), nearly standing condition, and a viscosity of 70 (poise) at a shear rate of 100 (1/sec) at an application point, thereby exhibiting thixotropy. With coating material b, the following problems were caused. Pin holes were generated because air bubbles were included between the coating material discharged from the outlet at the tip of the nozzle and the surface of the substrate. Furthermore, the thickness of the film had a large value of 50 µm. In addition, coating material c, another comparison example, had a viscosity of 30 (Poise) at a shear rate of 0.1 (1/sec), nearly standing condition, and a low viscosity of 20 (poise) at a shear rate of 100 (1/sec) at an application point. When the coating material has such a low viscosity, the coating material discharged from the discharge port at the tip of the nozzle can be applied to the surface of the substrate to form a thin film. However, the coating material applied in a film form spreads, and the width of the film becomes larger after application. Therefore, the edge linearity at both ends of the width cannot be maintained but distortion occurs. In comparison with these coating materials b, c, coating material a in accordance with Embodiment 4 was produced to have a high viscosity of 110 (Poise) at a shear rate of 0.1 (1/sec), nearly standing condition, and a low viscosity of 40 (Poise) at a shear rate of 100 (1/sec) at a application point so as to offer thixotropy. Since coating material a has a relatively low viscosity at the application point, the coating material discharged from the nozzle can be applied to the surface of the substrate to form a thin film just as in the case of Embodiment 1. Furthermore, coating material a in a film condition after application has a high viscosity, the edge linearity along the application width and at both ends of the width can be maintained, whereby the linear patterns 15 and the belt-shaped pattern 16 can be formed highly accurately.

With the above-mentioned coating material characteristics, in the structure having a constant gap between the outlet-side edge at the tip of the nozzle and the substrate, thin films can be formed uniformly, and formed patterns can be stabilized without being distorted. In addition, the step difference between the outlet-side edge 3b and the guides 4 at the tip of the nozzle 1 is set at 25 µm, and the step difference between the guides 8 and the outlet-side edge 6a at the tip of the nozzle 6 is set at 100 µm in Embodiment 4. However, by increasing or decreasing these step differences, the thickness of the film immediately after application can be controlled in the range of 5 to 500 µm. Furthermore, although the sectional shape of the substrate is circular in Embodiment 4, the shape is not limited to be circular.

Even when the shape is nearly circular, oval or polygonal, or has a combined shape of these, the same effect can be obtained by changing the shape of the tip of the nozzle depending on the shape of the substrate.

(Embodiment 5)

Embodiment 5 features an application apparatus comprising a nozzle provided with guides disposed at both ends of the tip thereof in the direction of application width and protruding to a substrate, means for moving the nozzle and the substrate relative to each other, and means for pressing the substrate and the guides relative to each other.

The apparatus performs application by using the application system shown in FIGS. 4 and 5 comprising the nozzle 1 shown in FIG. 1 and the nozzle 6 shown in FIG. 2. By contacting and pressing the guides 4 disposed at the tip of the nozzle 1 and the guides 8 disposed at the tip of the nozzle 6 against the surface of the glass substrate 5, the gap between the surface of the substrate and the coating material storage portion 3a disposed at the tip of the nozzle 1 and the gap between the surface of the substrate and the outlet-side edge 3b disposed at the tip of the nozzle 1 can be maintained constant, whereby the coating material can be discharged so that the thickness of a film can be made constant. Similarly, when the guides 8 disposed at the tip of the nozzle 6 are contacted with and pressed against the substrate, the gap between the surface of the substrate 5 and the outlet-side edge 6a can also be maintained constant, whereby the coating material can be discharged so that the thickness of a film can be made constant. These guides disposed at the tips of the nozzles are contacted with and pressed against the surface of the substrate 5 by using the soft-touch jig 11 shown in FIG. 5. In the present embodiment, the pressing load is set to 100 g by using spring pressure. As moving means used to form the linear pattern 15, the linear-motor-type slide stage 10 is used to move the glass substrate 5 at a constant speed of 2.5 mm/sec in the axial direction, while the nozzles are stationary. Alternatively, the nozzles can be moved by using similar means, while the substrate is stationary. When forming the belt-shaped pattern 16, the ultrasound motor 9b is used to perform rotation at a constant speed. A coating material which is dispersion of the composition shown in TABLE 1 is used as the coating material 12. With this structure of the application apparatus, in the case of forming the linear pattern 15, the coating material 12 supplied and charged into the coating material storage portion 3a at the tip of the nozzle 1 is applied, while the slide stage 10 is moved, so as to form a film having a thickness of 25 $\mu$m on the surface of the substrate. The edge linearity at both ends of the application width can have a value of ±2 $\mu$m by virtue of the guides 4. Moreover, the film thickness and the edge linearity obtained when the above-mentioned linear pattern 15 is formed can also be obtained when the belt-shaped pattern 16 is formed. With the above-mentioned structure of the application apparatus, film patterns can be formed highly accurately on the substrate by using the application apparatus in accordance with the present embodiment, which has been difficult to be attained with conventional methods.

The step difference between the outlet-side edge 3b and the guides 4 at the tip of the nozzle 1 is set at 25 $\mu$m, and the step difference between the guides 8 and the outlet-side edge 6a at the tip of the nozzle 6 is set at 100 $\mu$m in the present embodiment. However, by setting these step differences in the range of 5 to 2000 $\mu$m, the thickness of the film immediately after application can be controlled as desired. Furthermore, although the nozzle is pressed against the glass substrate 5 in the present embodiment, the substrate can be pressed against the tip of the nozzle, or the nozzle and the substrate can be pressed relative to each other. In addition, although a coil spring is used as means for pressing the guides disposed at the tip of the nozzle against the substrate, it is possible to use a leaf spring, an air cylinder, an oil damper, a magnet or a combination of these devices instead. Besides, although the load for pressing the guides disposed at the tip of the nozzle against the substrate is 100 g in the present embodiment, the load can be set in the range of 10 to 500 g. If the load is set in this range, the guides of the nozzle can follow the undulation and distortion generated on the surface of the substrate by virtue of the soft-touch jig 11. Furthermore, although the sectional shape of the substrate is circular, the shape is not limited to be circular. Even when the shape is nearly circular, oval or polygonal, or has a combined shape of these, the same effect can be obtained.

(Embodiment 6)

Embodiment 6 features an application apparatus comprising guides having an inner dimension therebetween similar to a predetermined application width, disposed at both ends of the tip of a nozzle in the direction of application width and protruding to a substrate, wherein the tips of the guides have small flat portions. Other structures are similar to those in accordance with Embodiment 1 and not described here. The small flat portions are obtained by chamfering the tip portions by a value in the range of 0.01 to 1 mm.

In Embodiment 6, the inner dimension (width) between the guides 4 disposed at both ends of the tip of the nozzle 1 shown in FIG. 1 in the direction of application width and protruding to the substrate is set at 1.8 mm so as to be equal to the width of the linear pattern 15 of the light-shielding film shown in FIG. 3, and the step difference between the outlet-side edge 3b and the tips of the guides 4 is set at 25 $\mu$m. In addition, the tips of the guides 4 have flat portions measuring 0.05 mm in Embodiment 6. A coating material which is dispersion of the composition shown in TABLE 1 is used as the coating material 12.

With the structure of the nozzle, the coating material is applied to form a linear pattern on the surface of the glass substrate 5 in the axial direction thereof by using the application system shown in FIG. 4. After the flat portions of the guides 4 at the tip of the nozzle 1 are contacted with and pressed against the surface of the substrate 5, the coating material is supplied and charged into the coating material storage portion 3a disposed at the tip of the nozzle 1 just as in the case of Embodiment 1. At this time, since the guides 4 disposed at both ends of the tip of the nozzle 1 in the direction of application width and protruding to the substrate are linearly contacted with and pressed against the glass substrate 5, the coating material 12 is completely prevented from leaking in the circumferential direction, whereby the amount of the coating material charged into the coating material storage portion 3a can be maintained. In the present embodiment, the nozzle is stationary, and the substrate 5 is moved at a constant speed of 2.5 mm/sec in the axial direction by the slide stage 10. By this movement, the coating material 12 supplied and charged into the coating material storage portion 3a at the tip of the nozzle is applied to form a film having a thickness of about 25 $\mu$m. At this time, the guides 4 having the small flat surfaces at the tip of the nozzle 1 follow the undulation and distortion generated on the surface of the glass substrate 5 by virtue of the soft-touch jig 11. As a result, the gap between the outlet-side edge 3b at the tip of the nozzle and the substrate is maintained constant, and the film is formed to have a uniform thickness. In addition, by controlling the width of application by using the guides 4, the edge linearity along the application width and at both ends of the width of the linear pattern can be maintained at an accuracy value of ±2 $\mu$m.

Furthermore, in the present embodiment, the inner dimension between the guides 8 at the tip of the nozzle 6 shown in FIG. 2 is set at 8.2 mm which is equal to the width of the belt-shaped pattern of the light-shielding film shown in FIG. 3, the step difference between the outlet-side edge 6a and the tip of the guide 8 is set at 100 $\mu$m, and a flat portion measuring 0.5 mm is formed at the tip of the guide. By using the ultrasound motor 9b shown in FIG. 4, the coating material 12 is applied to an area between the two linear patterns formed on the surface of the glass substrate 5 in a range of 220° in the circumferential direction. After the guides 8 disposed at the tip of the nozzle 6 are contacted with and pressed against the surface of the substrate 5, the coating material 12 is supplied and charged into the tip of the nozzle, and the glass substrate 5 is rotated 220° in the circumferential direction at a constant speed. At this time, just as in the case of the application of the coating material for forming the linear pattern, the nozzle 6 follows the undulation and distortion generated on the surface of the glass substrate 5 in the circumferential direction thereof and transmitted from the guides 8 disposed at the tip of the nozzle 6 by virtue of the soft-touch jig 11, whereby the gap between the outlet-side edge 6a and the substrate 5 is maintained constant. As a result, the film can have a uniform thickness. In addition, by the control of the guides 8, application can be performed stably at all times in the circumferential direction so that an edge linearity of ±2 $\mu$m can be obtained along the application width of 8.2 mm and at both ends of the width. With the above-mentioned structure of the application apparatus, linear and belt-shaped patterns or predetermined film patterns can be formed highly accurately, while the thickness and width values thereof are maintained accurately, which has been difficult to be attained by using conventional methods. In addition, the step difference between the outlet-side edge 3b and the guides 4 at the tip of the nozzle 1 is set at 25 $\mu$m, and the step difference between the guides 8 and the outlet-side edge 6a at the tip of the nozzle 6 is set at 100 μm in Embodiment 6. However, by increasing or decreasing these step differences, the thickness of the film immediately after application can be controlled in the range of 5 to 500 μm. Furthermore, although the nozzles are pressed against the glass substrate 5 in the present embodiment, the substrate can be pressed against the nozzles, or the nozzles and the substrate can be pressed relative to each other. Moreover, although the sectional shape of the substrate is circular in the present embodiment, the shape is not limited to be circular. Even when the shape is nearly circular, oval or polygonal, or has a combined shape of these, the same effect can be obtained by changing the shape of the tip of the nozzle depending on the shape of the substrate.

(Embodiment 7)

Embodiment 7 features an application apparatus having a coating material storage portion at the tip of a nozzle capable of storing at least the amount of the coating material required for application, and a structure providing a predetermined gap to the substrate at least on the outlet side of the nozzle.

Figure 9:
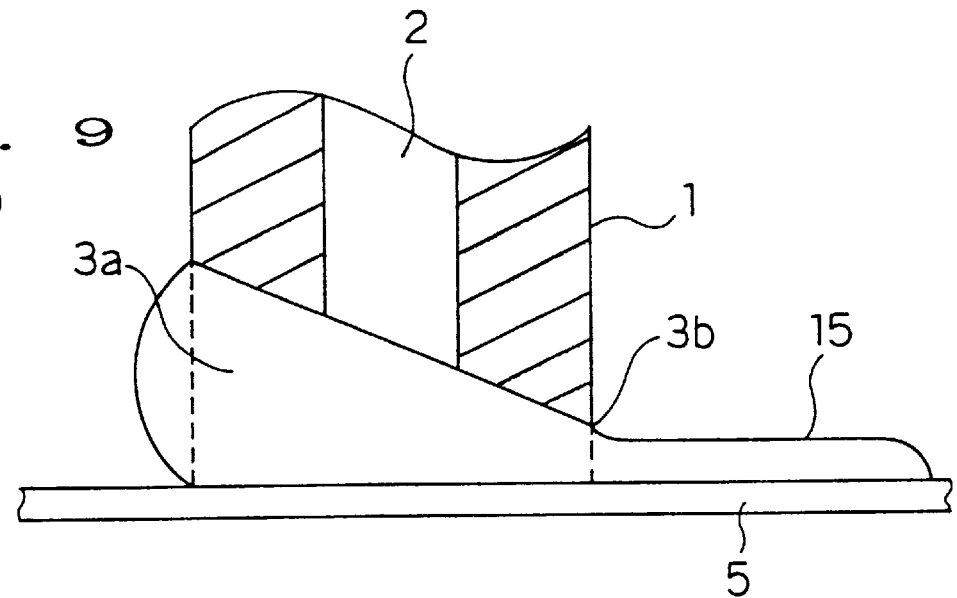
FIGS. 9a and 9b are sectional views showing the tips of nozzles in accordance with a seventh embodiment of the present invention.
Figure 9:
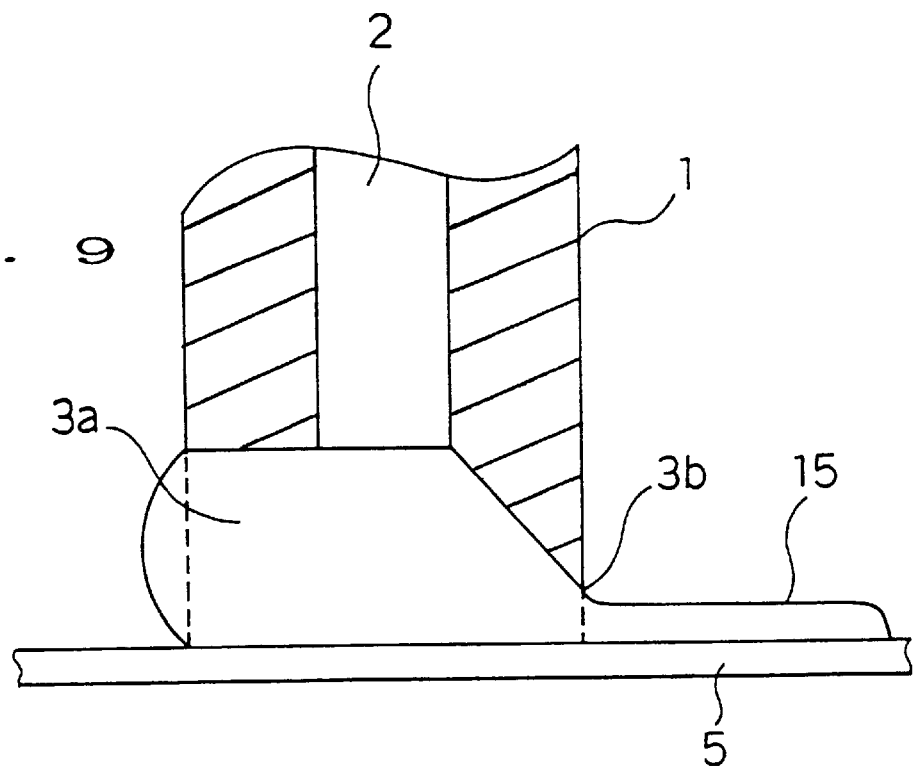

FIG. 9 is a view showing the sectional shape of the tip of a nozzle 1 in accordance with the present embodiment. The gap between the outlet-side edge 3b of the nozzle and a substrate 5 is appropriately determined in consideration of a predetermined film thickness. A coating material storage portion 3a is provided at the tip of the nozzle 1. The portion 3a is used to store an amount of the coating material required for forming a predetermined pattern or more amount of the coating material. The cross section of the coating material storage portion 3a can have a triangular shape as shown in FIG. 9a or a trapezoidal shape as shown in FIG. 9b.

Application is performed as described below. After the coating material is charged into the coating material storage portion 3a, the nozzle 1 and the substrate 5 are moved relative to each other, and the and coating material is applied from the coating material storage portion 3a to the substrate.

In the present embodiment, the inner dimension (width) between the guides 4 disposed at both ends of the tip of the nozzle 1 shown in FIG. 1 in the direction of application width and protruding to the substrate is set at 1.8 mm so as to be equal to the width of the linear pattern 15 of the light-shielding film shown in FIG. 3, the coating material storage portion 3a is formed on the side in the direction of travel for coating material application, and the step difference between the outlet-side edge 3b and the tips of the guides 4 is set at 25 μm. A coating material which is dispersion of the composition shown in TABLE 1 is used as the coating material 12.

With the structure of the nozzle, the coating material 12 is applied to form a linear pattern on the surface of the glass substrate 5 in the axial direction thereof by using the application system shown in FIG. 4. About 0.001 cc of the coating material 12 is supplied and charged into the coating material storage portion 3a disposed at the tip of the nozzle 1. At this time, the coating material 12 is completely prevented from leaking by the guides 4 disposed at both ends of the tip of the nozzle 1 in the direction of application width and protruding to the substrate, whereby the amount of the coating material 12 supplied and charged into the coating material storage portion 3a is maintained. In Embodiment 7, the nozzle is stationary, and the substrate 5 is moved at a speed of 2.5 mm/sec in the axial direction by the slide stage 10. In accordance with this movement, the coating material 12 supplied and charged into the coating material storage portion 3a at the tip of the nozzle 1 is applied from the outlet-side edge 3b to form a pattern, while a film thickness of about 25 μm is maintained and the application width is also maintained at 1.8 mm by the guides 4. At this time, the nozzle 1 follows the undulation and distortion generated on the surface of the substrate 5 in the axial direction thereof and transmitted from the guides 4 disposed at the tip of the nozzle 1 by virtue of the soft-touch jig 11, whereby the gap between the outlet-side edge 3b at the tip of the nozzle 1 and the substrate 5 is maintained constant at all times. As a result, the film can have a uniform thickness. In addition, the width of application is controlled by the guides 4. Consequently, an edge linearity of ±2 μm can be maintained along the application width and at both ends of the width of the linear pattern. In addition, in the present embodiment, the inner dimension (width) between the guides 8 disposed at the tip of the nozzle 6 shown in FIG. 2 is set at 8.2 mm so as to be equal to the width of the belt-shaped pattern 16 of the light-shielding film shown in FIG. 3, and the step difference between the outlet-side edge 6a and the guides 8 is set at 100 μm. By using the application system shown in FIG. 4, the coating material 12 is applied to an area between the two linear patterns formed on the surface of the glass substrate 5 in a range of 220° in the circumferential direction. After the guides 8 are contacted with and pressed against the surface of the substrate 5, about 0.005 cc of the coating material 12 is supplied and charged into the step difference to the coating material storage portion 6b. After this, the glass substrate 5 is rotated 220° in the circumferential direction at a constant speed by the ultrasound motor 9b. At this time, the nozzle 6 follows the undulation and distortion generated in the circumferential direction and transmitted from the guides 8 by virtue of the soft-touch jig 11, whereby the gap between the outlet-side edge 6a and the substrate 5 is maintained constant. As a result, the thickness of the film can be maintained at 100 μm or less in the width direction in a wet condition. In addition, by the application width control of the guides 8, the width is maintained at 8.2 mm. Consequently, application can be performed stably so that an edge linearity of ±2 μm can be obtained at both ends of the width.

The step difference between the outlet-side edge 3b and the guides 4 at the tip of the nozzle 1 is set at 25 μm, and the step difference between the guides 8 and the outlet-side edge 6a at the tip of the nozzle 6 is set at 100 μm in the present embodiment. However, by increasing or decreasing these step differences, the thickness of the film immediately after application can be controlled as desired. Furthermore, although the nozzle is pressed against the glass substrate 5 in the present embodiment, the substrate can be pressed against the nozzle, or the nozzle and the substrate can be pressed relative to each other. Moreover, although the sectional shape of the substrate is circular in the present embodiment, the shape is not limited to be circular. Even when the shape is nearly circular, oval or polygonal, or has a combined shape of these, the same effect can be obtained.

(Embodiment 8)

Embodiment 8 features an application apparatus, wherein the sectional shape of a nozzle in the direction of application width at least on the outlet side of the nozzle is nearly equal to the sectional shape of a substrate, and the gap between the nozzle and the substrate in the direction of application width is made uniform.

Other structures are similar to those in accordance with Embodiment 1 and not described here.

In the present embodiment, as shown in FIG. 8a, the sectional shape of the outlet-side edge 3b at the tip of the nozzle 1 in the direction of application width is a curve having a radius of curvature nearly equal to that of the sectional shape of the substrate so as to apply a coating material in the axial direction of the glass substrate 5. In addition, the step difference between the outlet-side edge 3*b* and the guides 4 disposed at both ends of the tip of the nozzle 1 in the direction of application width and protruding to the substrate is set at 25 $\mu$m. In the present invention, the sectional shape of the substrate is not limited to be circular. Even when the sectional shape of the substrate has two flat surfaces as shown in FIG. 8*b*, at least the sectional shape of the outlet-side edge 3*b* is formed to have a shape similar to that of the substrate. The sectional shape of the substrate is not limited to this shape, but can be nearly circular, oval or polygonal, or has a combined shape of these. At least the sectional shape of the outlet-side edge 3*b* of the nozzle is aligned to the sectional shape of each substrate. In addition, in the nozzle 6 shown in FIG. 2, the slit-shaped discharge port 7 for applying the coating material in a belt-shaped pattern in the circumferential direction has a flat surface, and the outlet-side edge 6*a* is in the same plane with the surface of the slit-shaped discharge port 7. Film patterns are formed by the basic application system shown in FIG. 4 by using the soft-touch jig 11 used as means for pressing the substrate shown in FIG. 5 and the guides disposed at the tip of the nozzle relative to each other. A coating material which is dispersion of the composition shown in TABLE 1 is used as the coating material 12.

First, the tips of the guides 4 disposed at the tip of the nozzle 1 are pressed against the surface of the glass substrate 5 at a load of 100 g in the present embodiment. The coating material 12 is supplied and charged into the coating material storage portion 3*a* disposed at the tip of the nozzle 1. The nozzle is stationary, and the glass substrate 5 is moved at a speed of 2.5 mm/sec in the axial direction by the slide stage 10. In accordance with this movement, the coating material 12 supplied and charged into the coating material storage portion 3*a* at the tip of the nozzle 1 is discharged and applied from the outlet-side edge 3*b* to form a pattern, while a film thickness of about 25 $\mu$m is maintained. The nozzle 1 follows the undulation and distortion generated on the surface of the substrate 5 in the axial direction thereof and transmitted from the guides 4 disposed at the tip of the nozzle 1 by virtue of the soft-touch jig 11, whereby the gap between the outlet-side edge 3*b* at the tip of the nozzle 1 and the substrate 5 is maintained constant at all times. As a result, the film can have a uniform thickness. In addition, the width of application is controlled by the guides 4. Consequently, an edge linearity of ±2 $\mu$m can be maintained at both ends of the application width. After the guides 8 disposed at the tip of the nozzle 6 shown in FIG. 2 are contacted with and pressed against the surface of the substrate 5 by the soft-touch jig 11, the coating material 12 is supplied and charged into the coating material storage portion 6*b*. After this, application is performed while the glass substrate 5 is rotated 220° in the circumferential direction at a constant speed by the ultrasound motor 9*b*. At this time, the nozzle 6 also follows the undulation and distortion generated on the glass substrate 5 in the circumferential direction and transmitted from the guides 8 disposed at the tip of the nozzle 6 by virtue of the soft-touch jig 11, whereby the gap between the outlet-side edge 6*a* and the substrate 5 is maintained constant. As a result, the film can have a uniform thickness. In addition, the width of application is controlled by the guides 8. Consequently, application can be performed stably at all times so that an edge linearity of ±2 $\mu$m can be maintained along the application width and at both ends of the application width.

The step difference between the outlet-side edge 3*b* and the guides 4 at the tip of the nozzle 1 is set at 25 $\mu$m, and the step difference between the guides 8 and the outlet-side edge 6*a* at the tip of the nozzle 6 is set at 100 $\mu$m in the present embodiment. However, by increasing or decreasing these step differences, the thickness of the film immediately after application can be controlled in the range of 5 to 500 $\mu$m. Furthermore, although the nozzle is pressed against the glass substrate 5 in the present embodiment, the substrate can be pressed against the nozzle, or the nozzle and the substrate can be pressed relative to each other.

(Embodiment 9)

Embodiment 9 features an application apparatus comprising means for holding and securing a cylindrical substrate with rod-shaped members in at least three directions toward the sectional center of the cylindrical substrate, means for moving the cylindrical substrate in the axial direction thereof or/and for rotating the cylindrical substrate around the sectional center thereof, and means for applying a coating material to form film patterns in the axial or/and circumferential direction of the cylindrical substrate by using nozzles. Other structures are similar to those in accordance with Embodiment 1.

A soft-touch jig 11, provided with the nozzle 1 shown in FIG. 1 and the nozzle shown in FIG. 2, functions as means for pressing the substrate shown in FIG. 5 and the guides disposed at the tips of the nozzles relative to each other. The soft-touch jig 11 is disposed on the same vertical axis as an axis on which the nozzles are mounted. These devices are installed at predetermined positions in the basic application system shown in FIG. 4. In the present embodiment, the holding jig 9*a* of the rotary chuck jig 9 shown in FIG. 4 is used to hold the substrate by using cylindrical members arranged in three directions with respect to the sectional center of the glass substrate 5. The glass substrate 5 having been held and secured is moved in the axial direction thereof by a linear-motor-type slide stage 10, and rotated in the circumferential direction thereof by an ultrasound motor 9*b*. A coating material which is dispersion of the composition shown in TABLE 1 is used as the coating material 12.

With the structure of the application apparatus, the glass substrate 5 is held and secured horizontally with the holding jig 9*a* of the rotary chuck jig 9. The substrate 5 is first rotated to the application position for forming a linear pattern by the ultrasound motor 9*b*, and the guides 4 disposed at the tip of the nozzle 1 are pressed against the substrate 5 by the soft-touch jig 11. The coating material 12 is supplied and charged into the coating material storage portion 3*a* disposed at the tip of the nozzle 1 by a pump 13 just as in the case of Embodiment 1. In Embodiment 9, the nozzle is stationary, and the glass substrate 5 is moved at a constant speed in the axial direction by the slide stage 10. In accordance with this movement, the coating material 12 supplied and charged into the coating material storage portion 3*a* is applied from the outlet-side edge 3*b* to form a film, while a film thickness of about 25 $\mu$m is maintained. The nozzle 1 follows the undulation and distortion generated on the surface of the substrate 5 in the axial direction thereof and transmitted from the guides 4 disposed at the tip of the nozzle 1 by virtue of the soft-touch jig 11, whereby the gap between the outlet-side edge 3*b* at the tip of the nozzle 1 and the substrate 5 is maintained constant at all times. As a result, the film can have a uniform thickness. In addition, the width of application is controlled by the guides 4. Consequently, a linear pattern can be formed at an edge linearity of ±2 $\mu$m at both ends in the direction of application width. After the coating material 12 is applied to form two linear patterns as described above, the guides 8 disposed at the tip of the nozzle 6 shown in FIG. 2 are contacted with and pressed against the surface of the glass substrate 5 just as in the case of the nozzle 1, and the coating material 12 is supplied and charged into the coating material storage portion 6b at the tip of the nozzle 6. The coating material 12 is then applied while the substrate 5 is rotated by a predetermined angle in the circumferential direction at a constant speed by the ultrasound motor 9b. At this time, the nozzle 6 follows the undulation and distortion generated on the surface of the substrate 5 in the circumferential direction thereof and transmitted from the guides 8 disposed at the tip of the nozzle 6 by virtue of the soft-touch jig 11, whereby the gap between the outlet-side edge 6a and the substrate 5 is maintained constant. As a result, the film can have a uniform thickness. In addition, the width of application is controlled by the guides 8. Consequently, application can be performed stably at all times at an edge linearity of ±2 μm along the application width and at both ends of the width of the belt-shaped pattern.

With the above-mentioned application system of the application apparatus in accordance with Embodiment 9, the glass substrate 5 can be held and secured stably and horizontally by the cylindrical members in three directions with respect to the sectional sensor of the substrate 5, and by moving the substrate 5 in the axial direction in this condition by using the slide stage, the coating material 12 can be applied to form a linear pattern, whereby accurate film patterns can be formed on the substrate, which has been difficult to be attained by using conventional methods. In addition, while the glass substrate 5 is held and secured, the substrate 5 is moved to the application position for the next linear pattern by the ultrasound motor 9b to which the holding jig 9a is secured. Furthermore, in order to form a belt-shaped pattern in the circumferential direction, the substrate 5 is moved at a constant speed, whereby a film can be formed stably. Furthermore, although the nozzle is pressed against the glass substrate 5 in Embodiment 9, the substrate can be pressed against the nozzle, or the nozzle and the substrate can be pressed relative to each other. Moreover, although the sectional shape of the substrate is circular in Embodiment 9, the shape is not limited to be circular. Even when the shape is nearly circular, oval or polygonal, or has a combined shape of these, the same effect can be obtained by changing the shape of the tip of the nozzle depending on the shape of the substrate.

(Embodiment 10)

Embodiment 10 features an application method comprising a step of contacting the guides disposed at both ends of the tip of a nozzle in the direction of application width and protruding to a substrate with the substrate, a step of moving the nozzle and the substrate relative to each other and performing application while quantitatively supplying a coating material to the tip of the nozzle, and a step of stopping the supply of the coating material to the tip of the nozzle immediately before the end of application so that the coating material remaining at the tip of the nozzle is used to complete application. Other structures are similar to those in accordance with Embodiment 1, and not described here.

Figure 10:
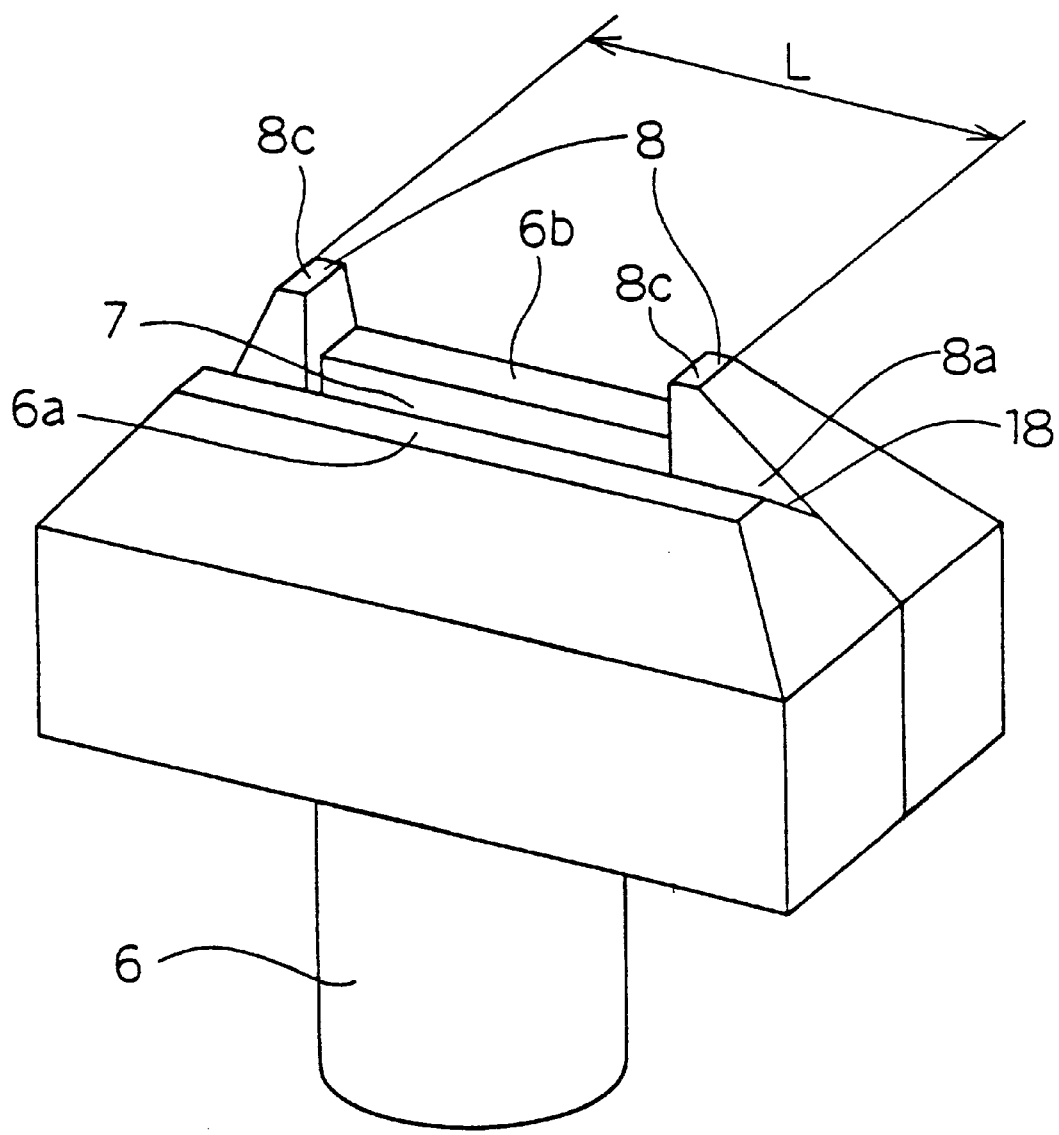
FIG. 10 is a perspective view showing the tip of a nozzle in accordance with a tenth embodiment of the present invention.

The structure of the guides 8 disposed at both ends of the tip of the nozzle 6 shown in FIG. 10 in the direction of application width and protruding to the substrate is similar to that shown in FIG. 2, except that the guides 8 are disposed only on a first lip side, and that as a coating material storage portion 6b, an outlet-side edge 6a and a guide groove 18 (having a wedge shape shown in FIG. 11) for guiding the coating material to both ends of the slit-shaped discharge port 7 are formed up to the rear surfaces 8a of the guides 8 on a second lip side. In addition, the step difference between the coating material storage portion 6b and the tips of the guides 8 is set at 100 μm. Furthermore, the outer dimension (distance L between the outer fringes of the upper end surfaces 8c of the guides 8) at the tip of the nozzle including the guides 8 is set equal to a target application width. A coating material having the composition shown in TABLE 1 is used as the coating material 12.

With the above-mentioned structure of the nozzle, by using the ultrasound motor 9b of the application system shown in FIG. 4, the coating material 12 is applied to the surface of the glass substrate 5 at an area between the two linear patterns formed on the surface of the glass substrate 5 in a range of 220° in the circumferential direction so as to form a belt-shaped pattern 16.

Figure 11:
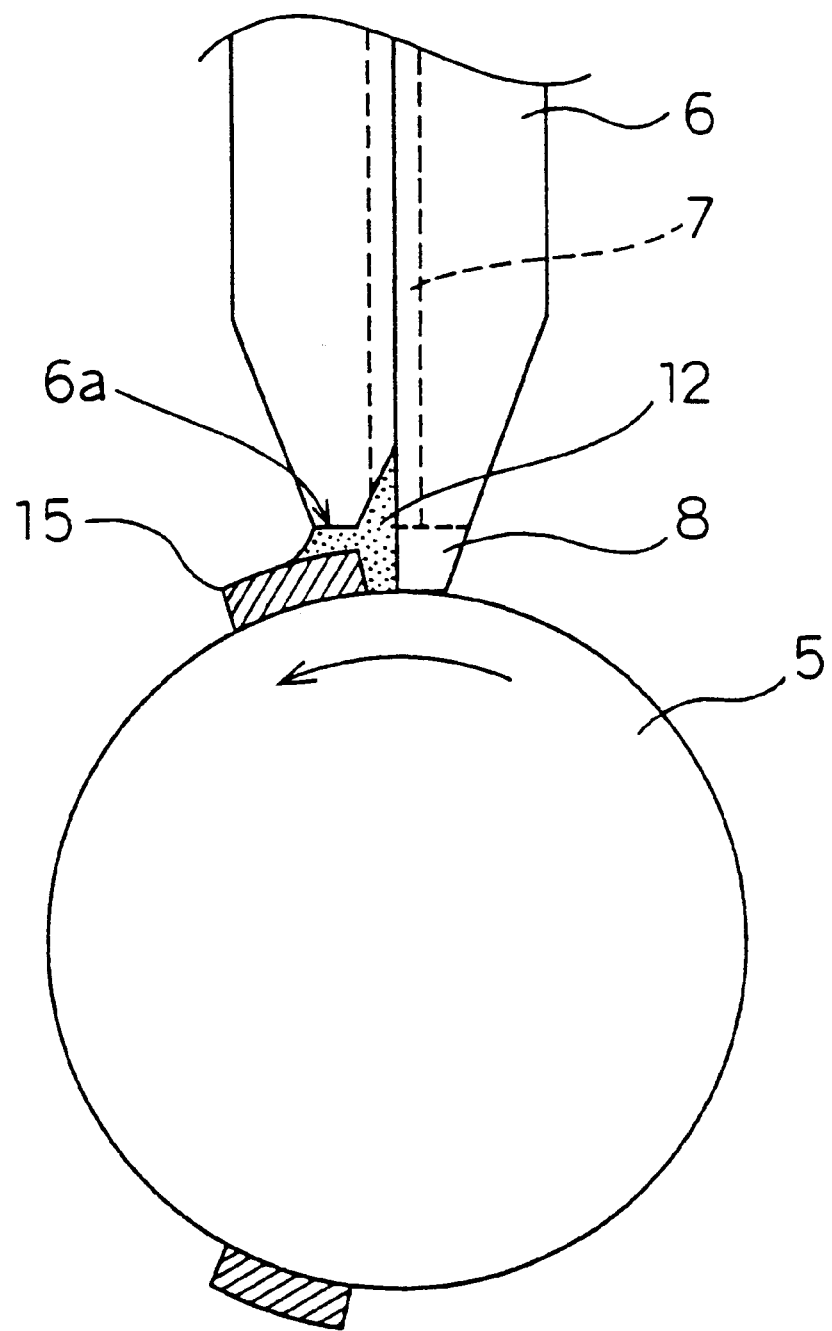
FIG. 11 is a side view showing the tip of the nozzle at an application portion in accordance with the tenth embodiment of the present invention.

First, the guides 8 disposed at the tip of the nozzle are pressed against predetermined positions on the surface of the glass substrate 5 so that the outlet-side edge 6a is placed to slightly cover the edge of the linear pattern 15 as shown in FIG. 11. When the coating material 12 is supplied quantitatively to the coating material storage portion 6b disposed at the tip of the nozzle, the coating material 12 is fed between the guides 8 and the glass substrate 5. Furthermore, the coating material 12 is fed through guide grooves 18 formed at both ends of the slit-shaped discharge port 7 in the direction of application width and retained by surface tension. The glass substrate 5 is then moved 220° in the circumferential direction at a constant speed. The tip of the nozzle is contacted with and pressed against the substrate 5. From the start of application, just as in the case of the application for the linear pattern 15, the nozzle 6 follows the undulation and distortion generated on the surface of the glass substrate 5 in the circumferential direction thereof and transmitted from the guides 8 disposed at the tip of the nozzle 6 by virtue of the soft-touch jig 11, whereby the gap between the outlet-side edge 6a and the substrate 5 is maintained constant. As a result, the film can have a uniform thickness.

In addition, in the present embodiment, since outer dimension L between the guides 8 is set at 8.2 mm which is equal to the width of the belt-shaped pattern of the light-shielding film shown in FIG. 3, the application width of the belt-shaped pattern 16 can have a desired width. At this time, the edge linearity at both ends of the width is not controlled by the guides 8 but depends on the movement speed of the substrate 5 in the circumferential direction. Nevertheless, the coating material 12 can be applied stably at all times at an accuracy of ±4 μm. This phenomenon occurs since the coating material has a low viscosity. Furthermore, since the supply of the coating material 12 is controlled by time setting, and the time period for the supply is set slightly shorter than that required for the rotation of the substrate 5 by 220° in the circumferential direction, the supply of the coating material 12 is stopped immediately before the completion of the rotation so that the coating material 12 remaining in the coating material storage portion 6b is used to complete application. This prevents the coating material 12 from dripping at the end of application or prevents excessive storage. As a result, a proper film having a uniform thickness can be formed at the connection portion to the edge of the second linear pattern 15.

By using the above-mentioned application method and apparatus, linear and belt-shaped patterns or predetermined film patterns having accurate thickness and width values can be formed highly accurately, which has been difficult to be attained by conventional methods.

Furthermore, in Embodiment 10, the step difference between guides 8 and the coating material portion 6b at the tip of the nozzle 6 is set at 100 μm. However, by increasing or decreasing this step difference, the thickness of the film immediately after application can be controlled in the range of 5 to 500 μm. Moreover, although the guide grooves 18 for guiding the coating material are disposed at both ends of the slit-shaped discharge port 7 on the side of the second lip, the grooves 18 can be disposed on the side of the first lip or on the sides of both lips. In addition, although the nozzle is pressed against the glass substrate 5 in the present embodiment, the substrate can be pressed against the nozzle, or the nozzle and the substrate can be pressed relative to each other. Furthermore, the guides 8 disposed at the tip of the nozzle 6 can be disposed at the outlet-side edge 6a, but not required to be disposed at the coating material storage portion 6b. In other words, the coating material storage portion 6b having no guide (it can be said that no coating material is stored since there is no guide) is moved first, and the outlet-side edge 6a having the guides is then moved. Even when this structure is used to perform application, the same effect as that described above can be obtained. In particular, higher accuracy, that is, an edge linearity of ±2 μm, can be obtained at both ends of the width.

As clearly disclosed by the above-mentioned descriptions, the application method and apparatus in accordance with the present invention can apply a coating material to the surface of a substrate having a circular sectional shape or a complicated sectional shape, such as a polygonal shape, so that a film pattern having a uniform thickness can be formed and so that the edge linearity at both ends of the pattern can have a highly accurate value on the order of micron.

As a result, by using the above-mentioned application method and apparatus of the present invention, light-shielding films or predetermined film patterns can be accurately formed on cylindrical substrates of high-luminance discharge lamps for automotive headlamps, which has been difficult to be attained by conventional methods.

What is claimed is:

1. A coating material application method for forming a film on a cylindrical glass substrate, including the steps of directly contacting said substrate with guides which protrude toward said substrate from a discharge port surface which includes a discharge port of a nozzle and disposed at both ends of the tip of said nozzle in the direction of application width to maintain a constant gap between at least the outlet-side edge at the tip of said nozzle and the surface of said substrate.

2. A coating material application method according to claim 1, wherein application is performed while said guides of said nozzle and said substrate are pressed relative to each other.

3. A coating material application method according to claim 1, wherein the sectional shape of said substrate is circular, nearly circular, oval or polygonal, or has a combined shape of these.

4. A coating material application method according to claim 1, wherein the thickness of a film is in the range of 5 to 500 μm in a wet condition immediately after application.

5. A coating material application method comprising a step of charging a predetermined amount of coating material into a coating material storage portion disposed at the tip of a nozzle, said storage portion being located between guides which protrude toward said substrate from a discharge port surface which includes a discharge port of said nozzle, and a step of moving said nozzle and a substrate relative to each other and applying said coating material stored in said coating material storage portion to said substrate, said guides maintaining a constant gap between the outlet-side edge at the tip of said nozzle and the surface of said substrate.

6. A coating material application apparatus for applying a coating material to a substrate, comprising a nozzle having guides disposed at both ends of the tip thereof in the direction of application width, said guides protruding toward said substrate from a discharge port surface which includes a discharge port of said nozzle into direct contact with a substrate, said guides maintaining a constant gap between the outlet-side edge at the top of said nozzle and the surface of said substrate, moving means for moving said nozzle and said substrate relative to each other, and pressing means for pressing said substrate and said guides relative to each other.

7. A coating material application apparatus for applying a coating material to a cylindrical glass substrate, wherein a coating material storage portion capable of storing at least an amount of a coating material required for application is disposed at the tip of a nozzle, said storage portion being located between guides which protrude toward said substrate from a discharge port surface which includes a discharge port of said nozzle and into direct contact with the substrate to provide a predetermined gap between said coating material storage portion and the surface of said substrate at least on the outlet side of said nozzle.

8. A coating material application apparatus according to claim 7, in combination with a substrate which has a non-planar surface area, wherein the nozzle has a sectional shape in the direction of application width which is substantially the same as that of the non-planar surface area of the substrate at least on the outlet side of said nozzle, and the nozzle forms a gap between said nozzle and the surface of said substrate, said gap being substantially uniform in the direction of application width.

9. A coating material application apparatus according to claim 6, wherein the sectional shape of said substrate is circular, nearly circular, oval or polygonal, or has a combined shape of these.

10. A coating material application apparatus according to claim 7, comprising guides disposed at both ends of the tip of said nozzle in the direction of application width and protruding to said substrate, and pressing means for pressing said nozzle and said substrate relative to each other.

11. A coating material application apparatus according to claim 6, wherein said pressing means is a spring, an air cylinder, an oil damper, a magnet or a combination of these devices.

12. A coating material application apparatus according to claim 6, wherein the height of said guides of said nozzle is in the range of 5 to 2000 μm.

13. A coating material application apparatus according to claim 6, wherein force for pressing said substrate and said guides relative to each other is in the range of 10 to 500 g.

14. A coating material application method for applying a coating material to a substrate, comprising a step of contacting said substrate with guides disposed at both ends of the tip of a nozzle in the direction of application width, said guides protruding toward said substrate from a discharge port surface which includes a discharge port of said nozzle and into direct contact with said substrate, said guides maintaining a constant gap between the outlet-side edge at the top of said nozzle and the surface of said substrate, a step of moving said nozzle and said substrate relative to each other and performing application while quantitatively supplying a coating material to the tip of said nozzle immediately before the end of application so that coating material remaining at the tip of said nozzle is used to complete application.

15. A coating material application method according to claim 14, wherein grooves are formed at both ends of the tip of said nozzle, and application is performed while said coating material is quantitatively supplied to the tip of said nozzle, the outer dimension at the tip of said nozzle including said guides being equal to a target application width, said coating material being guided by said grooves to an outlet of the nozzle.

* * * * *